United States Patent
Na et al.

(10) Patent No.: US 9,959,086 B2
(45) Date of Patent: May 1, 2018

(54) ELECTRONIC DEVICE AND CONTROL METHOD THEREOF

(71) Applicant: LG ELECTRONICS INC., Seoul (KR)

(72) Inventors: Sungchae Na, Seoul (KR); Jungeun Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 296 days.

(21) Appl. No.: 14/149,399

(22) Filed: Jan. 7, 2014

(65) Prior Publication Data

US 2014/0201637 A1     Jul. 17, 2014

(30) Foreign Application Priority Data

Jan. 11, 2013  (KR) .................. 10-2013-0003239

(51) Int. Cl.
*G06F 3/16*    (2006.01)
*G06F 3/0488*  (2013.01)
(Continued)

(52) U.S. Cl.
CPC ............ *G06F 3/165* (2013.01); *G06F 3/0488* (2013.01); *G06F 3/04847* (2013.01); *G10L 15/26* (2013.01); *G11B 27/034* (2013.01); *H04N 5/772* (2013.01); *H04N 9/8063* (2013.01); *H04N 21/41407* (2013.01); *H04N 21/4325* (2013.01); *H04N 21/440236* (2013.01);
(Continued)

(58) Field of Classification Search
CPC ........... G06F 17/30038; G06F 3/04847; G06F 3/0488; G06F 3/165; G11B 27/034; G11B 27/322; G11B 27/34; H04N 1/00307; H04N 21/4223; H04N 1/00204; H04N 1/00132; H04N 1/00183; H04N 21/41407; G10L 15/26
See application file for complete search history.

(56) References Cited

U.S. PATENT DOCUMENTS

2001/0000540 A1* 4/2001 Cooper ................ G11B 27/034
                                                        711/104
2004/0199420 A1* 10/2004 Bhakta ................... G06Q 30/02
                                                        705/14.4
(Continued)

FOREIGN PATENT DOCUMENTS

WO     2012/103267     8/2012

OTHER PUBLICATIONS

Apple Inc., "iPad User Guide for iOS 5.0 Software," XP055019962, Oct. 2011, 141 pages (relevant pages: pp. 61-65).
(Continued)

*Primary Examiner* — Amy Ng
*Assistant Examiner* — Tan H Tran
(74) *Attorney, Agent, or Firm* — Lee Hong Degerman Kang & Waimey

(57) ABSTRACT

There are provided an electronic device and a control method thereof. First contents related to an image and second contents generated by converting the recorded audio into text are displayed on a touchscreen, instead of a playback screen of the image when the electronic device plays the image and enters a mode for recording audio. Thus, a user can use a image, when viewing and listening to it, in various manners.

14 Claims, 39 Drawing Sheets

(51) Int. Cl.
  *H04N 21/4402* (2011.01)
  *G06F 3/0484* (2013.01)
  *G10L 15/26* (2006.01)
  *H04N 5/77* (2006.01)
  *H04N 9/806* (2006.01)
  *H04N 21/414* (2011.01)
  *H04N 21/432* (2011.01)
  *H04N 21/472* (2011.01)
  *G11B 27/034* (2006.01)
  *H04N 21/4223* (2011.01)
  *H04N 21/433* (2011.01)
  *G11B 27/34* (2006.01)

(52) U.S. Cl.
  CPC ....... *H04N 21/47217* (2013.01); *G11B 27/34* (2013.01); *H04N 21/4223* (2013.01); *H04N 21/4334* (2013.01)

(56) References Cited

U.S. PATENT DOCUMENTS

| | | |
|---|---|---|
| 2006/0092291 A1 | 5/2006 | Bodie |
| 2007/0081090 A1 | 4/2007 | Singh |
| 2007/0266304 A1* | 11/2007 | Fletcher ................ G06F 17/241 715/230 |
| 2008/0145032 A1* | 6/2008 | Lindroos ................ H04N 7/163 386/338 |
| 2008/0177536 A1* | 7/2008 | Sherwani .......... G06F 17/30746 704/235 |
| 2012/0174009 A1* | 7/2012 | Kwon ................... G06F 3/0481 715/768 |
| 2012/0236201 A1* | 9/2012 | Larsen ................. H04N 21/235 348/468 |
| 2012/0297284 A1* | 11/2012 | Matthews, III ... G06F 17/30038 715/233 |
| 2012/0308209 A1* | 12/2012 | Zaletel ................ G11B 27/034 386/278 |
| 2013/0007606 A1* | 1/2013 | Dolenc ............... G06F 17/2775 715/256 |
| 2013/0117027 A1* | 5/2013 | Choi ................... G06F 3/04842 704/275 |

OTHER PUBLICATIONS

European Patent Office Application Serial No. 13198683.8, Search Report dated Apr. 11, 2014, 11 pages.

* cited by examiner

< Playing audio related to item 21 >

⟨ Playing audio related to item 24 ⟩

| Status bar |
|---|
| Summary note |
| P. 21 ☆ text...<br>P. 22 text... |

ELECTRONIC DEVICE AND CONTROL METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2013-0003239, filed on Jan. 11, 2013, the contents of which are incorporated by reference herein in their entirety.

TECHNICAL FIELD

The present invention relates to an electronic device and, more particularly, to an electronic device allowing for effectively viewing and listening audio of images, and a control method thereof.

DISCUSSION OF THE RELATED ART

In line with remarkable advancement of hardware and software technologies in relation to various electronic devices including mobile terminals, electronic devices quickly provide or store various types of functions and information. Thus, electronic devices provide various types of information through a screen thereof.

Also, in case of an electronic device having a touchscreen, various types of information provided to a touchscreen may be accessed through only a user's touch manipulation.

SUMMARY

An aspect of the present invention provides an electronic device capable of recording a sound input from the outside or a sound output in the electronic device, converting the recorded audio into text in real time, and displaying the same, thereby allowing a user to effectively listen and view an image in association with certain audio, and a control method thereof.

Another aspect of the present invention provides an electronic device capable of allowing a user to effectively listen to and view a video by minutely dividing images being played, and a control method thereof.

According to an aspect of the present invention, there is provided an electronic device including: a touchscreen; and a controller configured to display first contents related to playback of an image including associated audio and second contents generated by converting recorded audio into text on the touchscreen, while the audio is being recorded, when the electronic device enters a mode for recording the audio included in the played image through a predetermined input while the image including the associated audio is being played.

The image may include a still image or a moving image (or a video), and the played image includes a plurality of slides of still images sequentially displayed on the touchscreen and played video.

The controller may display a played screen of the video on the touchscreen, and the predetermined input may include a touch input previously determined with respect to the played screen of the video.

The first contents may include at least one of text and an image related to playback of the image.

The text of the second contents may be divided by sentences so as to be displayed.

When a predetermined input with respect to a particular sentence is received, the controller may play audio corresponding to the particular sentence.

The controller may display a progress bar indicating that the audio is being recorded on the touchscreen, and the progress bar may include a header indicating a recording spot at a current point in time, and when an input for dragging the header to a first point corresponding to a previous recording time is received, the controller may move the header to a second point corresponding to a starting point of a sentence including text corresponding to audio of the first point and display the sentence starting from the second point on the touchscreen.

When content included audio being output through playback of the image and related to the first contents is being recorded, the controller may display an indicator indicating that content related to the first contents of the image is being recorded, together with the first contents.

When an input for selecting the first contents displayed together with the indicator is received, the controller may play the recorded audio.

While the recorded audio is being played, the controller may record audio of the currently played image, as a background.

The controller may display a point corresponding to a point in time at which an input for selecting the first contents was received, in the progress bar for controlling playback of the image.

When a drag input with respect to at least a portion of text included in the second contents is received, the controller may delete a region corresponding to the dragged text of the recorded audio.

The first contents may include at least one item, and the indicator for associating the recorded audio content with the item may be displayed on the touchscreen, and when an input for associating the indicator with any one of the at least one item is received, the controller may map the recorded audio content to the item.

The controller may associate the indicator with any one of the at least one item through a user input.

The controller may analyze the recorded content and display the indicator such that it is associated with the item matched to the recorded content, among the at least one item.

The controller may display the first contents in a first region of the touchscreen and the second contents in a second region of the touchscreen, and when a touch input applied to a particular spot of the first region is received, the controller may provide a memo interface for receiving a memo to be inserted into the particular spot to at least a portion of the second region.

The predetermined touch input may include a zoom-in input with respect to the particular spot.

The memo interface may include an indicator for indicating whether a handwriting input region for receiving a user's handwriting input, a virtual keyboard region, or an audio input module for receiving a user's voice has been activated.

According to another aspect of the present invention, there is provided a control method of an electronic device, including: playing an image; when a predetermined input is received, entering a mode for recording audio included in the image; and displaying first contents related to playback of the image and second contents generated by converting the recorded audio into text on a touchscreen, while the audio is being recorded.

According to embodiments of the present invention, since audio of a played video is provided as text, a user can accurately recognize content of the image.

Also, according to embodiments of the present invention, by recording audio of a played image, a user can repeatedly listen to desired content.

Also, according to embodiments of the present invention, since audio of a played image is recorded, converted into text, and provided, together with relevant data of the image, to the user, efficiency of listening to the image can be enhanced through various recognition methods.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 33A through 34 are views illustrating a sixth embodiment of the present invention.

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

An electronic device may be described below with reference to the accompanying drawings. In the following description, suffixes "module" and "unit" may be given to components of the electronic device in consideration of only facilitation of description and do not have meanings or functions discriminated from each other.

The electronic device may include a cellular phone, a smart phone, a laptop computer, a digital broadcasting terminal, personal digital assistants (PDA), a portable multimedia player (PMP), a navigation system and/or so on.

Figure 1:
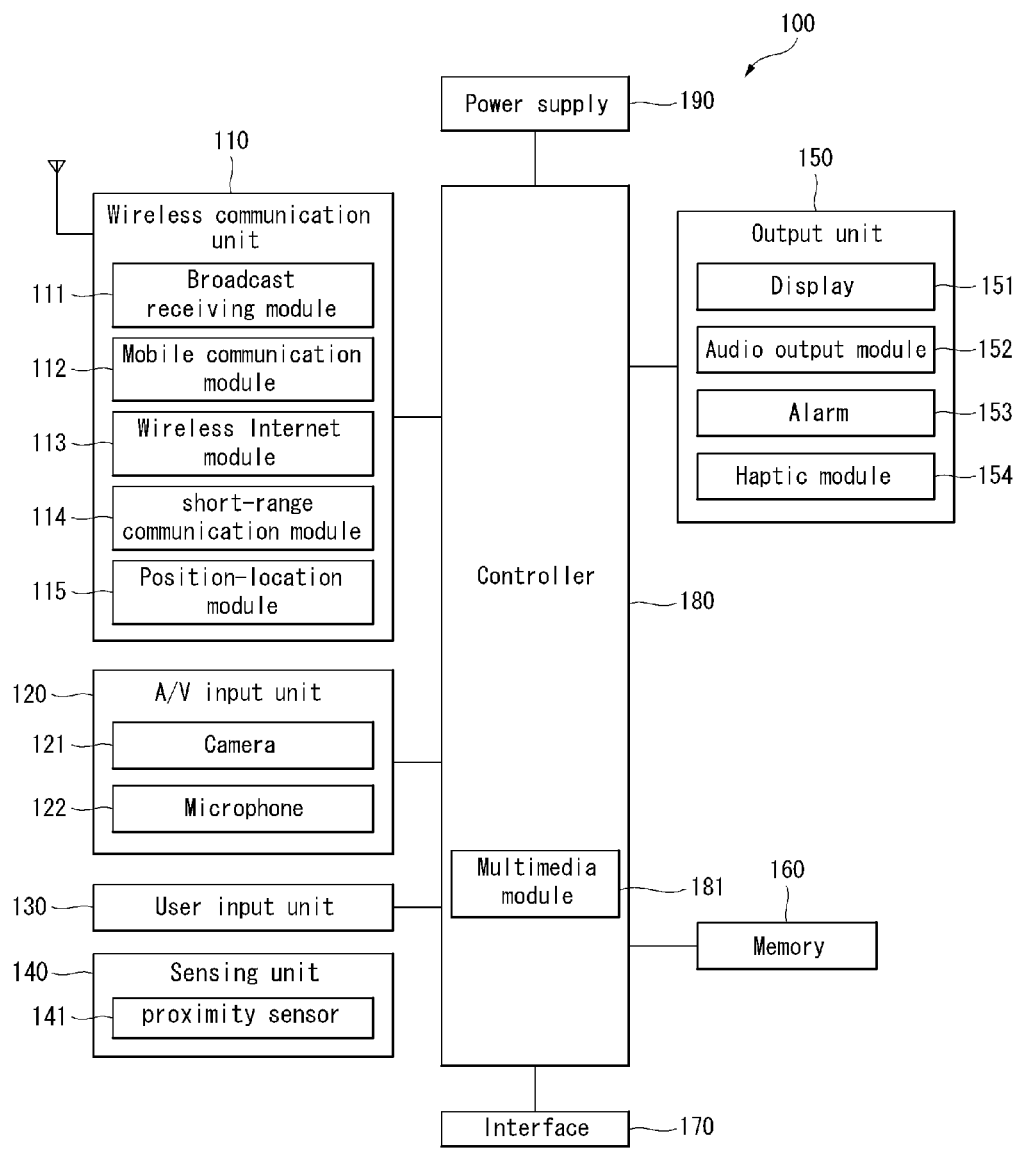
FIG. 1 is a block diagram of an electronic device according to an embodiment of the present invention.

FIG. 1 is a block diagram of an electronic device according to an embodiment. Other embodiments, configurations and arrangements may also be provided.

As shown, the electronic device 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the electronic device 100 may vary. Components of the electronic device 100 may now be described.

The wireless communication unit 110 may include at least one module that enables radio communication between the electronic device 100 and a radio communication system or between the electronic device 100 and a network in which the electronic device 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the electronic device 100 or may be externally attached to the electronic device 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the electronic device 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touchscreen.

The image frames processed by the camera 121 may be stored in the memory 160 or may be transmitted to an external device through the wireless communication unit 110. The electronic device 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the electronic device 100 from a user. The user input unit 130 may include a keypad, a dome switch, a touch pad (constant voltage/capacitance), a jog wheel, a jog switch and/or so on.

The sensing unit 140 may sense a current state of the electronic device 100, such as an open/close state of the electronic device 100, a position of the electronic device 100, whether a user touches the electronic device 100, a direction of the electronic device 100, and acceleration/deceleration of the electronic device 100, and the sensing unit 140 may generate a sensing signal for controlling operation of the electronic device 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor. The sensing unit 140 may sense a motion of the electronic device 100.

The output unit 150 may generate visual, auditory and/or tactile output, and the output unit 150 may include the display 151, an audio output module 152, an alarm 153 and a haptic module 154. The display 151 may display information processed by the electronic device 100. The display 151 may display a user interface (UI) and/or a graphic user interface (GUI) related to a telephone call when the electronic device 100 is in the call mode. The display 151 may also display a captured and/or received image, a UI or a GUI when the electronic device 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the electronic device 100) through the transparent area of the body of the electronic device 100 that is occupied by the display 151.

The electronic device 100 may also include at least two displays 151. For example, the electronic device 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touchscreen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor (of the sensing unit 140) may be located in an internal region of the electronic device 100, surrounded by the touchscreen, and/or near the touchscreen. The proximity sensor may sense an object approaching a predetermined sensing face or an object located near the proximity sensor using an electromagnetic force or infrared rays without having mechanical contact. The proximity sensor may have a lifetime longer than a contact sensor and may thus have a wide application in the electronic device 100.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touchscreen may be constructed such that proximity of a pointer is detected through a variation in an electric field according to the proximity of the pointer. The touchscreen (touch sensor) may be classified as a proximity sensor.

For ease of explanation, an action of the pointer approaching the touchscreen without actually touching the touchscreen may be referred to as a proximity touch and an action of bringing the pointer into contact with the touchscreen may be referred to as a contact touch. The proximity touch point of the pointer on the touchscreen may correspond to a point of the touchscreen at which the pointer is perpendicular to the touchscreen.

The proximity sensor may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touchscreen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the electronic device 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the electronic device 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The electronic device 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touchscreen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The electronic device 100 may also operate in relation to a web storage that performs a storing function of the memory 160 on the Internet.

The interface 170 may serve as a path to external devices connected to the electronic device 100. The interface 170 may receive data from the external devices or power and transmit the data or power to internal components of the electronic device 100 or transmit data of the electronic device 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the electronic device 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the electronic device 100 through a port of the interface 170.

The interface 170 may also be a path through which power from an external cradle is provided to the electronic device 100 when the electronic device 100 is connected to the external cradle or a path through which various command signals input by the user through the cradle are transmitted to the electronic device 100. The various command signals or power input from the cradle may be used as signals for confirming whether the electronic device 100 is correctly set in the cradle.

The controller 180 may control overall operations of the electronic device 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touchscreen as characters or images. The power supply 190 may receive external power and internal power and provide power required for operations of the components of the electronic device 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

The proximity sensor 141 described with reference to FIG. 1 may now be explained in detail with reference to FIG. 2.

Figure 2:
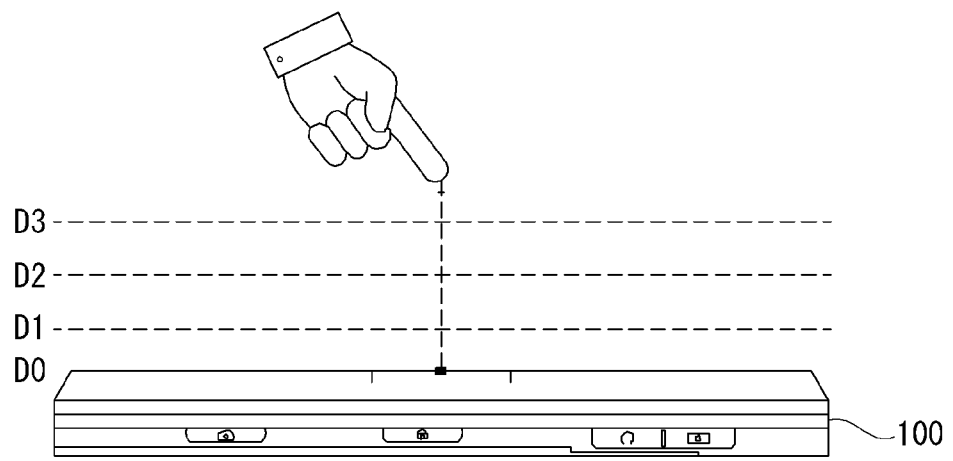
FIG. 2 is a diagram relating to a proximity depth of a proximity sensor.

FIG. 2 is a diagram relating to a proximity depth of a proximity sensor. Other embodiments, arrangements and configurations may also be used.

As shown in FIG. 2, when a pointer, such as a user's finger, a pen, a stylus and the like, approaches the touchscreen, the proximity sensor 141 provided within or in a vicinity of the touchscreen may detect the approach of the pointer and then output a proximity signal.

The proximity sensor 141 may output a different proximity signal according to a distance between the pointer and the proximity-touched touchscreen (hereafter referred to as a proximity depth).

FIG. 2 shows a cross-section of the touchscreen provided with a proximity sensor capable of detecting three proximity depths, for example. A proximity sensor that identifies less than 3 proximity depths or more than 4 proximity depths may also be provided.

If the pointer fully contacts the touchscreen (d0), a contact touch may be recognized. If pointer is spaced apart from the touchscreen by a distance less than d1, a proximity touch to a first proximity depth may be recognized. If the pointer is spaced apart from the touchscreen by a distance between d1 and d2, a proximity touch to a second proximity depth may be recognized. If the pointer is spaced apart from the touchscreen in a distance less than d3 or equal to or greater than d2, a proximity touch to a third proximity depth may be recognized. If the pointer is spaced apart from the touchscreen in a distance equal to or greater than d3, a proximity touch is released.

The controller 180 may recognize the proximity touch as one of various input signals according to proximity depth and position of the pointer. The controller 180 may perform various operation controls according to various input signals.

Hereinafter, embodiments of the present invention will be described.

In an embodiment of the present invention, the display unit 151 is assumed to be a touchscreen 151 for the description purpose. As described above, the touchscreen 151 may perform both an information display function and an information input function.

Figure 3:
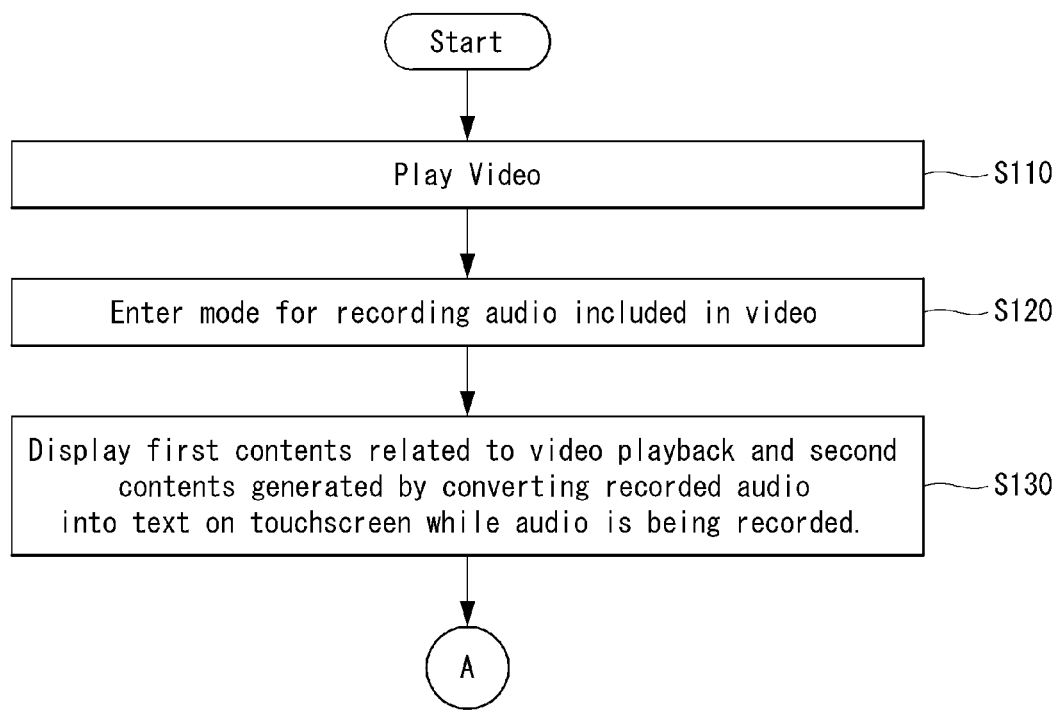
FIG. 3 is a flow chart illustrating a control method of an electronic device according to a first embodiment of the present invention.

FIG. 3 is a flow chart illustrating a control method of an electronic device according to a first embodiment of the present invention. A control method of an electronic device according to the first embodiment of the present invention may be implemented by the electronic device 100 described above with reference to FIGS. 1 and 2. Hereinafter, the control method of an electronic device according to the first embodiment of the present invention and an operation of the electronic device 100 for implementing the same will be described in detail with reference to required drawings.

Referring to FIG. 3, the controller 180 of the electronic device 100 plays (or reproduces) an image (S110).

The image may be played together with relevant audio. The image may include a still image or a video. The still image may include a plurality of slides applied for a slide show, for example. Meanwhile, the still image may include every image whose pages are turned over by the user or at predetermined time intervals. In the first embodiment of the present invention, it is presupposed that the image is played, but the present invention is not limited thereto. In particular, a process in which a lecturer performs a lecture by voice and contents related to lecturer content is displayed on the display unit 151 while the lecture content of the lecturer is being recorded may also be included in the scope of the present invention, and this will be described later with reference to FIGS. 35 and 36.

The image may be a file previously stored in the memory 160 of the electronic device 100. The image may be a file downloaded in a streaming manner from an external server (not shown).

Meanwhile, the image may include audio. For example, the image may be a video lecture file. Based on the lecture file, a lecture of a lecturer may be output by audio. However, the present invention is not limited thereto. For example, the video may be an image file including a plurality of persons and including audio spoken by the plurality of persons. Also, for example, the image may be a movie file.

Meanwhile, the image may be a file played for more than a predetermined time. For example, the image may be a file played for more than one minute. Namely, the image may exclude a file played for less than 10 seconds.

Meanwhile, an image applied to implement an embodiment of the present invention may include the foregoing audio, may be played for more than a predetermined time, and may additionally have contents related to the image playback. For example, the contents related to image playback may be sub-data for assisting listening to the image. Also, for example, the video may be related to a lecture and the sub-data may be a document file for assisting lecture content of a lecturer.

The controller 180 may enter a mode for recording audio included in the image (S120).

The controller 180 may record a video, may record audio associated with a slide show, or may extract an audio file included in the video and record the audio.

In the case in which the controller enters the mode for recording audio, the controller 180 may operate a microphone (122 in FIG. 1) of the electronic device 100. Also, the controller 180 may record audio output according to image playback, through the microphone.

Meanwhile, the input for entering the mode for recording audio may include a predetermined input with respect to an image playback screen. The predetermined input may include an ON/OFF switch button (including a switch button) for recording audio. Alternatively, the predetermined input may include a long-touch input with respect to the image playback screen. The controller 180 may turn on the microphone (122 in FIG. 1) in response to the long-touch input, and record audio output through image playback.

While the audio is being recorded, the controller 180 may display first contents in relation to image playback and second contents generated by converting the recorded audio into text, on the touchscreen 151 (S130).

In the following description, it is assumed that the image is a video related to a lecture.

As mentioned above, the first contents may be a lecture file obtained by summarizing lecture content by a lecturer. The lecture file is documented and displayed on the touchscreen 151. Also, the second contents may be a text file obtained by recording a lecture voice and changing the recorded voice into text by a lecturer. The text file may be generated in units of sentence or in units of phrases or words.

Meanwhile, in order to convert audio into text in an embodiment of the present invention, various known arts may be used and a detailed description thereof will be omitted.

Meanwhile, when the first contents and the second contents are displayed on the touchscreen 151, the controller 180 may hide a video playback screen from the touchscreen 151. For example, when the mobile terminal enters an audio recording mode while a video playback screen is being displayed, the controller 180 may display the first contents and the second contents in the entire regions of the touchscreen 151.

Figure 4:
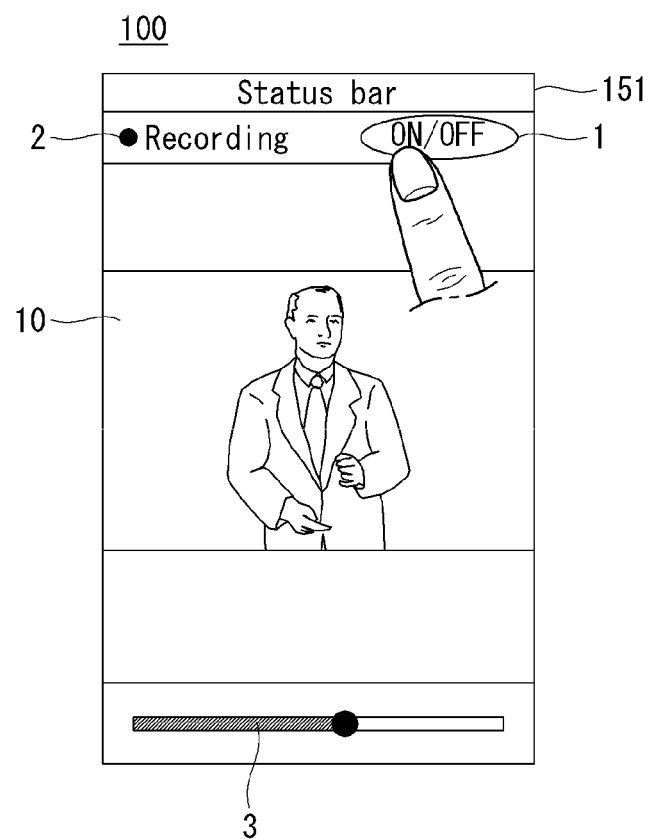
FIG. 4 is a view illustrating operations S110 and S120 in FIG. 3.

FIG. 4 is a view illustrating operations S110 and S120 in FIG. 3.

Referring to FIG. 4, the controller 180 may display a video playback screen 10 on the touchscreen 151. The controller 180 may display a progress bar 3 for controlling playback of the video on the touchscreen 151. Also, while the video is being played, the controller 180 may display a user interface (1 and 2) for entering a mode for extracting the audio included in the video and recording the same, on the touchscreen 151. The user interfaces may display a soft button (ON/OFF) 1 for selecting entering the recording mode and an identification sign (or mark) 2 for identifying that audio is being recorded when the recorded mode is entered through the soft button, on the touchscreen 151. When the recording mode is entered, the controller 180 may display a predetermined color identifier to indicate that the mode for recording audio has entered while the video is being played.

Figure 5:
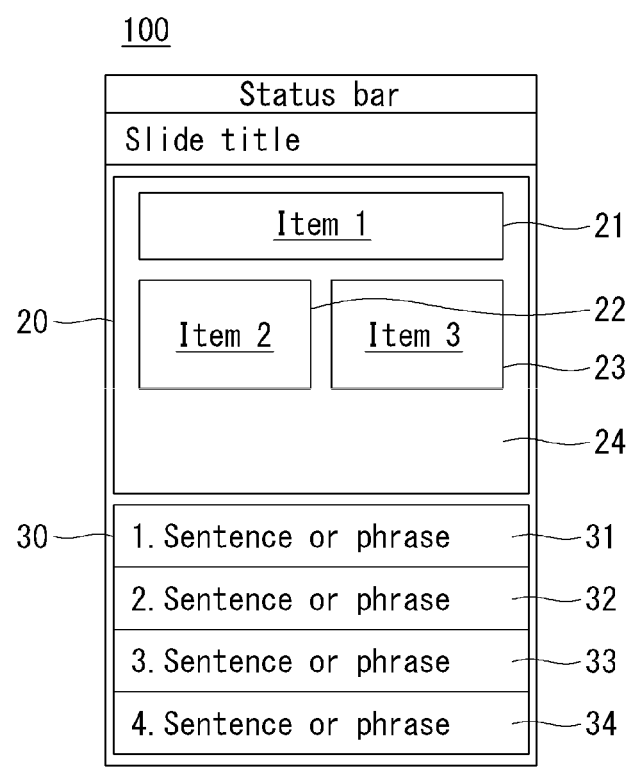
FIG. 5 is a view illustrating operation S130 in FIG. 3.

FIG. 5 is a view illustrating operation S130 in FIG. 3.

Referring to FIG. 5, the controller 180 may display first contents 20 related to video playback and a text file 30 generated by converting the audio being recorded while the video is being played, into text on the touchscreen 151.

The first contents 20 may include a plurality of items. For example, the first contents 20 may include a first item 21, a second item 22, a third item 23, and a fourth item 24. The items may include text, an image, and the like. Here, the fourth item 24 may include contents included in a region other than the first item 21, the second item 22, and the third item 23. For example, the first item 21 to the third item 23 may all be image files and the fourth item 24 may be text for explaining the images.

Meanwhile, the first contents 20 may be contents related to major content of the video being currently played.

The second contents 30 is a text file generated by recording audio output according to the video playback and converting it into text. The text file may be made up by sentences or paragraphs, so a plurality of sentences or paragraphs 31, 32, 33, and 34 may configure the second content 300.

For example, when the video is a lecture, a voice of a lecturer is recorded, lecture content is converted into text and displayed on the touchscreen 151.

Meanwhile, the controller 180 may update and display the second contents 30 in real time. Namely, the controller 180 may record the lecturer's voice, convert a voice in units of sentences into text in real time, and display the same as the second contents 30.

As illustrated in FIG. 5, according to an embodiment of the present invention, the user may listen to a video lecture with reference to lecture data 20, and is provided with lecture content of the lecturer as text-converted contents. Accordingly, the user may listen to the video lecture more effectively.

Meanwhile, in an embodiment of the present invention, the lecture content of the lecturer is converted into text and displayed, and in this case, the text is displayed by sentences. Thus, in an embodiment of the present invention, the user interface capable of conveniently controlling the lecture content of the lecturer by sentences can be provided.

Figure 6:
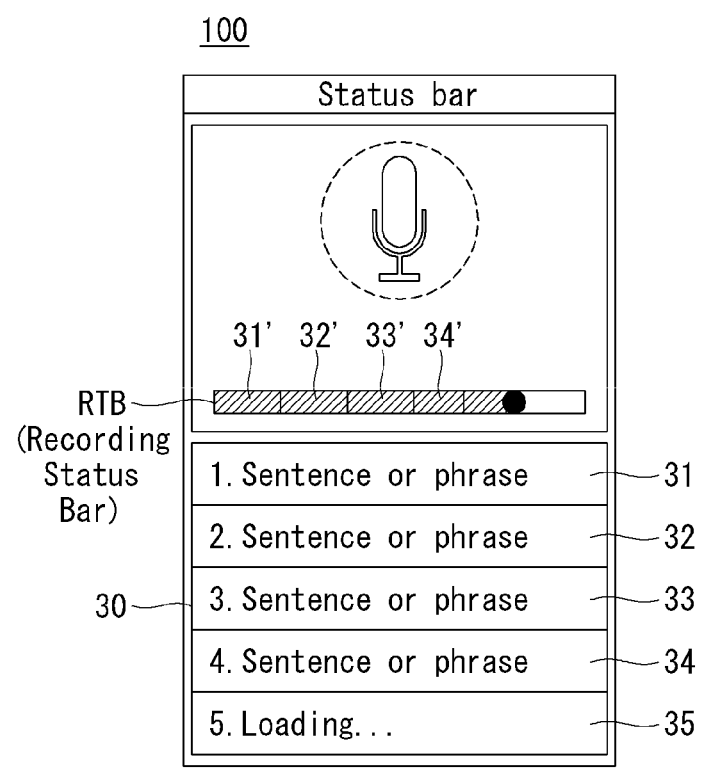
FIGS. 6 through 8 are views illustrating examples of controlling displaying of audio content which has been converted from text by using a progress bar.
Figure 7:
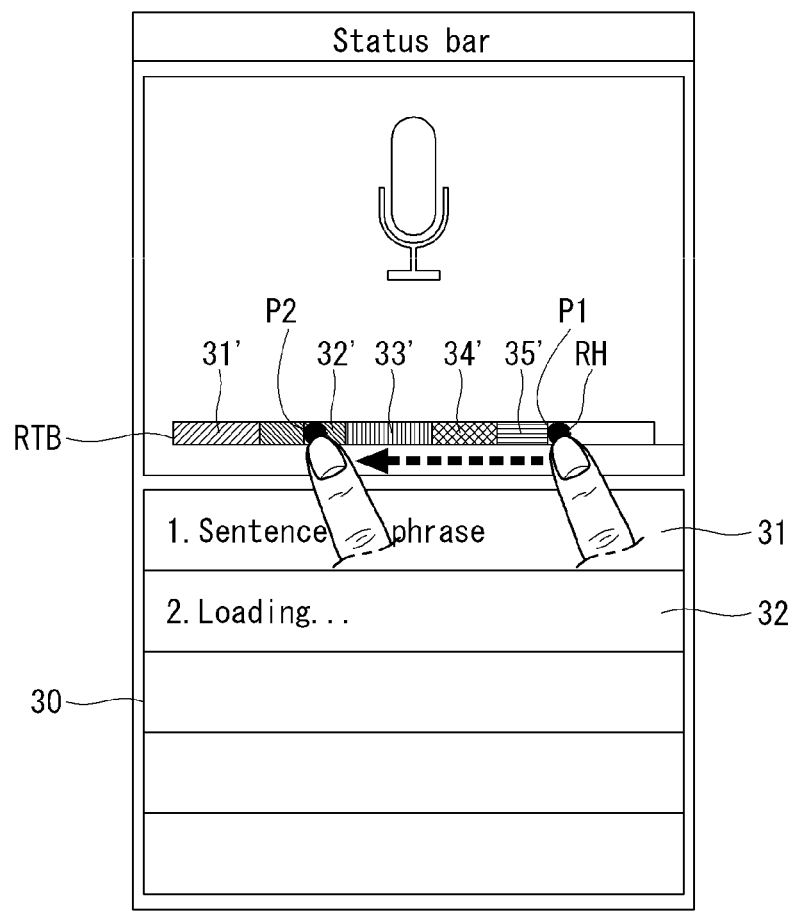
Figure 8:
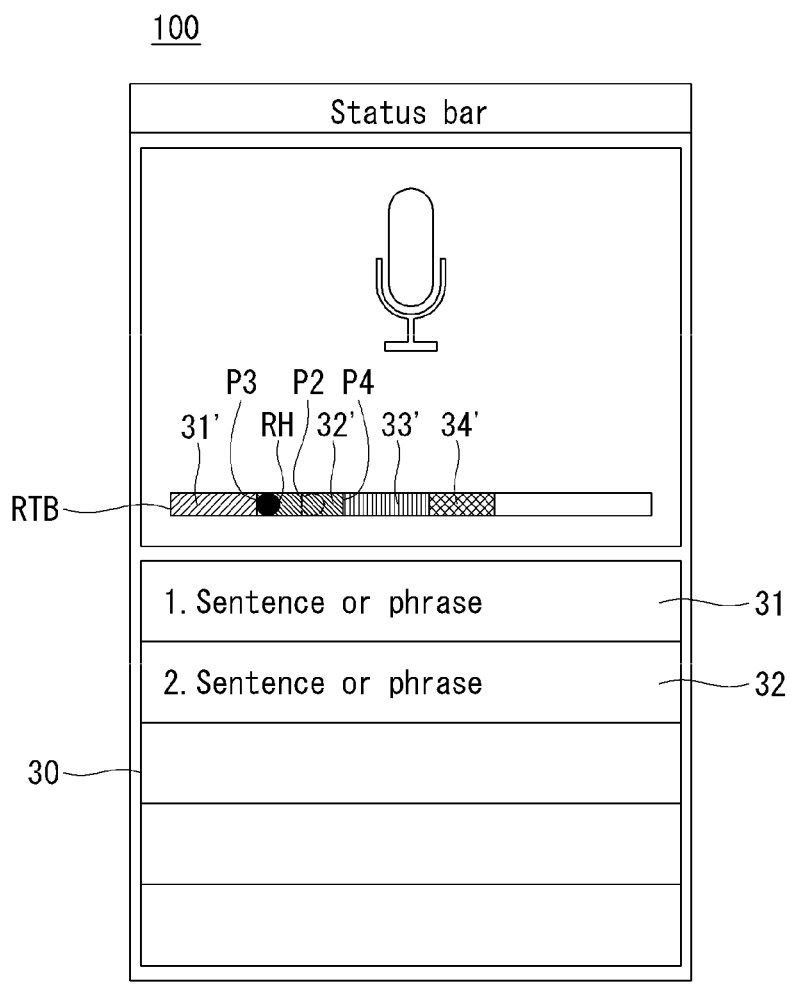

FIGS. 6 through 8 are views illustrating examples of controlling displaying of audio content which has been converted from text by using a progress bar.

Referring to FIG. 6, the controller 180 may display a recording status bar (RTB) for indicating progress of audio recording on the touchscreen 151. Here, the RTB may be divided into a plurality of sections 31', 32', 33', and 34'. The plurality of sections 31', 32', 33', and 34' may be sections differentiated by a time proportion allocated to each sentence when the audio being recorded is changed into text by sentences.

Namely, a first sentence 31 correspond to the first section 31' of the RTB, a second sentence 32 corresponds to the second section 32' of the RTB, a third sentence 33 corresponds to the third section 33' of the RTB, and a fourth sentence 34 corresponds to the fourth section 34' of the RGB. Meanwhile, in relation to a fifth sentence 35, when content of the audio being currently recorded is terminated as a single sentence, the controller 180 convert the audio corresponding to the single sentence into text and display it as the fifth sentence 35.

Meanwhile, referring to FIG. 7, the controller 180 may receive an input of dragging from a first point P1 of the RTB to a second point P2 correspond to a previous section. Here, the first point P1 corresponds to a fifth sentence section 35' and the second point P2 corresponds to a second sentence section 32' which has been previously recorded and changed into text. Meanwhile, in response to the drag input, the controller 180 may remove the fifth sentence 35, the fourth sentence 34, and the third sentence 33 of FIG. 6 from the touchscreen 151, and convert audio content recorded at a time corresponding to the second point P2 into text and display the same on the touchscreen 151. However, since the second point P2 is positioned in the middle of the second sentence section 32', the controller 180 cannot provide a complete second sentence.

Thus, as illustrated in FIG. 8, the controller 180 may automatically move a recording header (RH) positioned at the second point P2 of the second sentence section 32', so as to be positioned at the starting point P3 of the second sentence section 32 and display only the first sentence 31 on the touchscreen 151. Alternatively, the controller 180 may move the RH positioned at the second point P2 of the second sentence section 32,' so as to be positioned at the final point P4 of the second sentence section 32' and display the second sentence 32 on the touchscreen 151.

According to the foregoing embodiments, after recorded audio is changed into text by sentences, a desired portion of the recorded audio may be conveniently searched by controlling a predetermined user interface (e.g., the RSB). In particular, since the audio is changed in units of certain sentences, desired audio content can be searched while being quickly checked visually.

Figure 9:
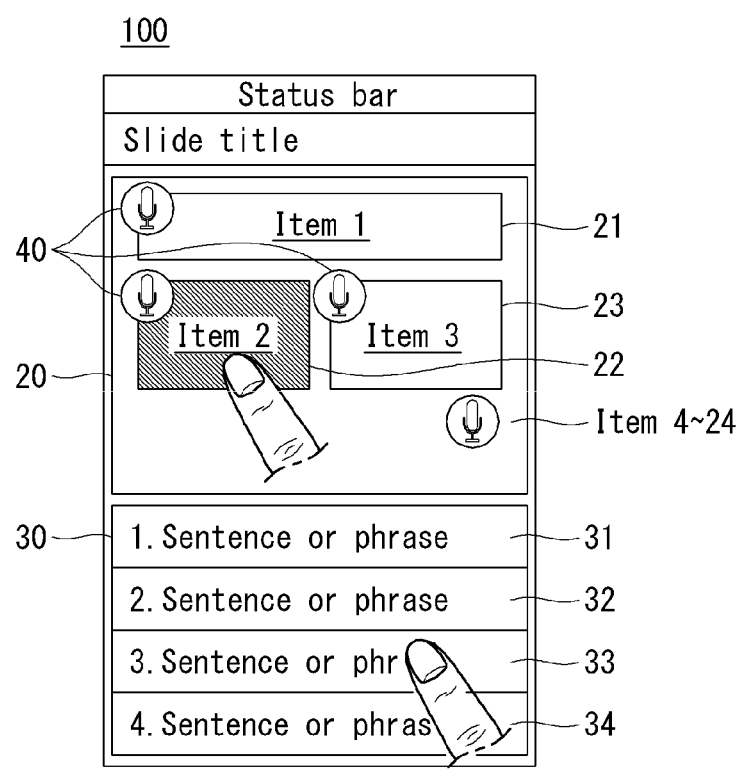
FIGS. 9 through 11 are views illustrating a first embodiment of the present invention.
Figure 10:
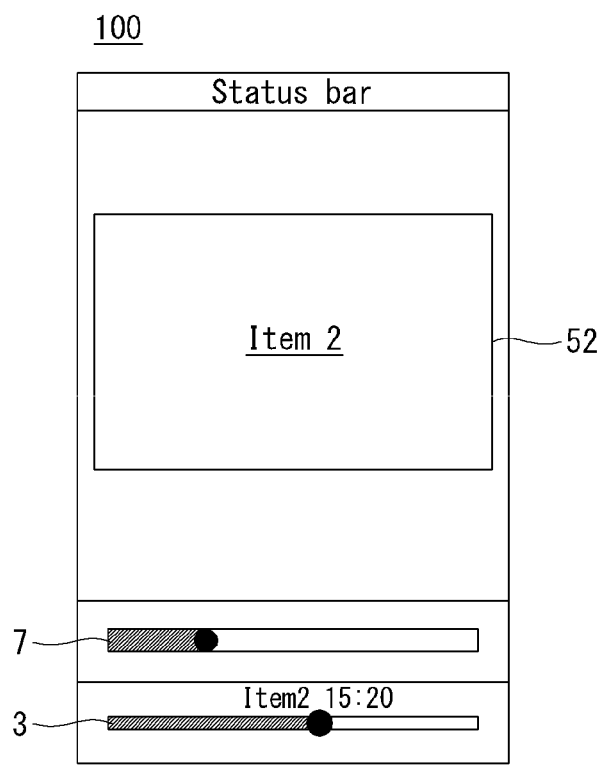
Figure 11:
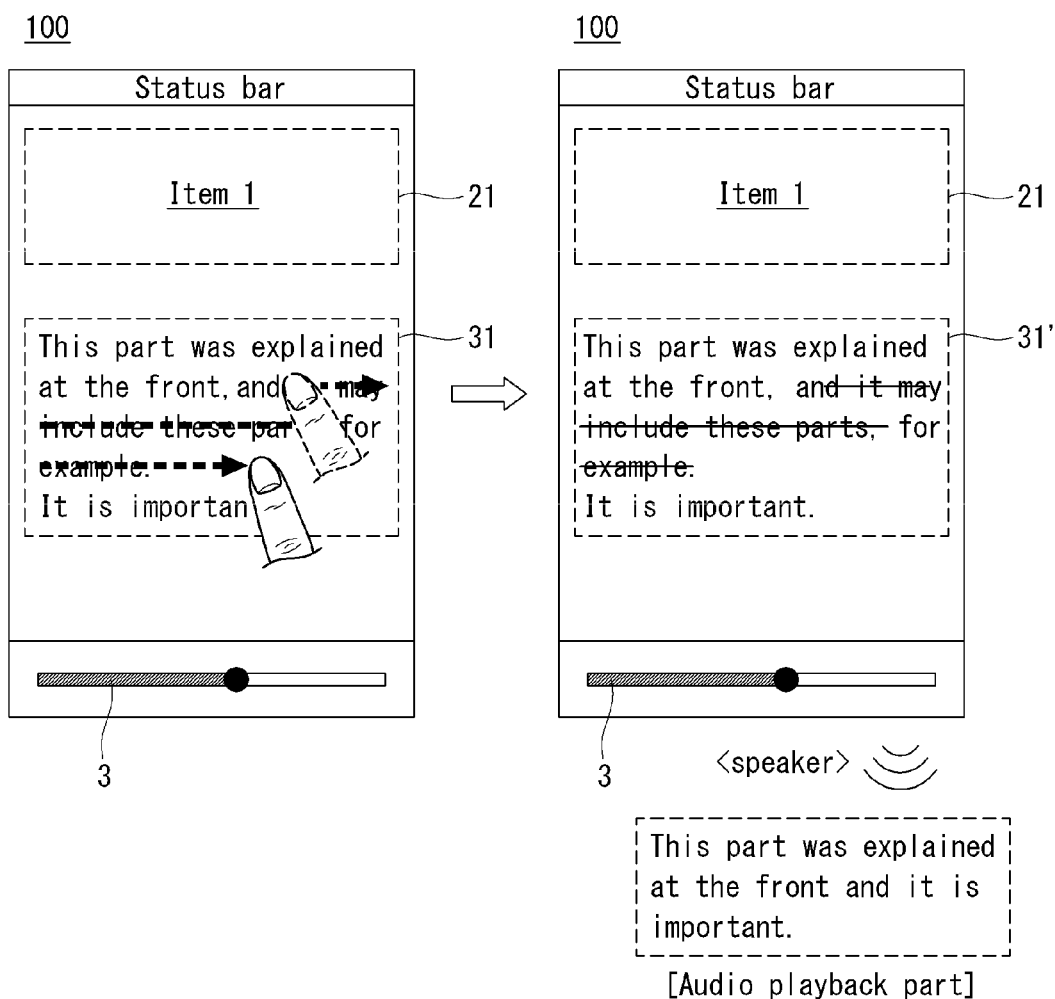

FIGS. 9 through 11 are views illustrating a first embodiment of the present invention.

Referring to FIG. 9, when content associated with the first contents 20 of the audio output through video playback is recorded, the controller 180 may display an indicator 40 indicating that content related to the first contents 20 is being recorded, on the touchscreen 151. The indicator 40 may be an icon having a microphone shape.

For example, when video lecture content being currently played is related to the first item 21, the controller 180 displays the indicator 40 together with the first item 21. Also, when video lecture content being currently played is related to the second item 22, the controller 180 displays the indicator 40 in the second item 22. This is the same for the third and fourth items.

Accordingly, the user may visually check which portion of the first contents 20 the lecture content being currently played is related.

Meanwhile, referring to FIG. 10, when a touch input for selecting the second item 20 is received in a state in which the indicator 40 illustrated in FIG. 9 is tagged and displayed, the controller 180 may temporarily stop the currently played video and play an audio file 52 recorded in relation to the second item 20.

Here, the controller 180 may display information regarding a point in time at which the second item 20 was selected, in the progress bar 3 for controlling playback of the recorded audio file on the touchscreen 151.

Meanwhile, when a touch input applied to the second item 20 is received, the controller 180 may continuously perform the audio recording operation. Namely, the audio related to the second item 20 may be played and output through the audio output module 152, while the audio recording is performed as a background. Also, text converted from the audio related to the second item 20 may also be provided through the touchscreen 151.

Also, the controller 180 may display the progress bar 7 for controlling playback of the audio file related to the selected second item 20 on the touchscreen 151.

Also, the controller 180 may display the progress bar 3 for controlling playback of the audio file 52 on the touchscreen 151.

FIG. 11 is a view illustrating an example of editing the second contents 20 displayed after being converted into text.

Referring to FIG. 11, when a drag input with respect to at least partial text included in the second contents 31 is received, the controller 180 may delete a region corresponding to the dragged text in the recorded audio.

For example, the controller 180 displays the first item 21 on the touchscreen 151, and while a video related to the first item 21 is being played, when a drag input with respect to "It may include these parts, for example" included in the second contents 31 as text converted from audio of the played video is received, the controller 180 applies a cancel line to the drag-input text portion (31'). Accordingly, the controller 180 may generate a new audio file with the dragged portion deleted, and store the same.

Figure 12:
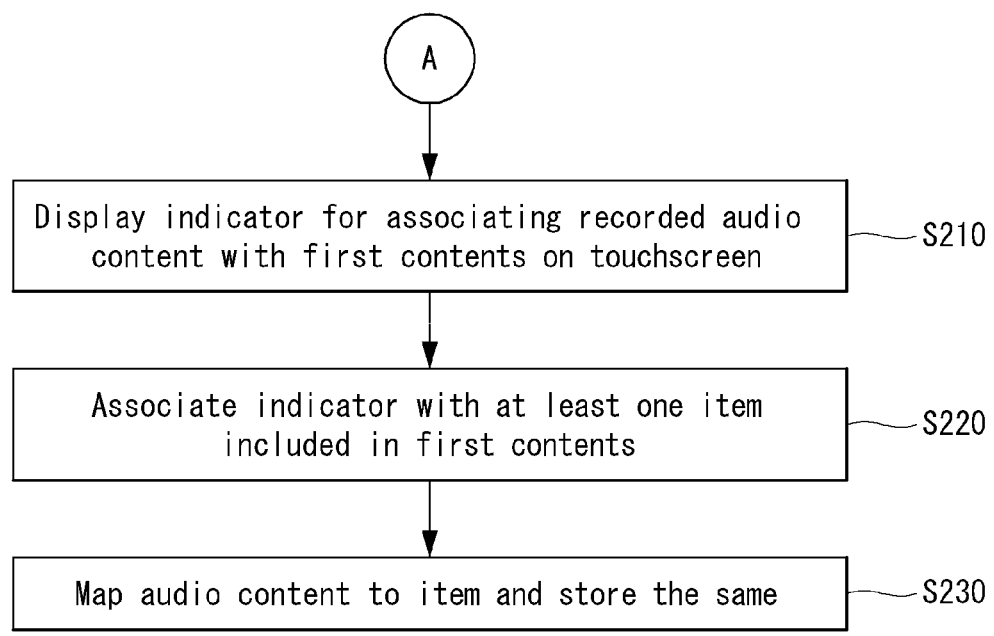
FIG. 12 is a flow chart illustrating a control method of an electronic device according to a second embodiment of the present invention.

FIG. 12 is a flow chart illustrating a control method of an electronic device according to a second embodiment of the present invention. The control method of an electronic device according to the first embodiment of the present invention may be implemented in the electronic device 100 described above with reference to FIGS. 1 and 2. Hereinafter, the control method of an electronic device according to the second embodiment of the present invention will be described in detail. The second embodiment of the present invention may be implemented based on the first embodiment as described above.

Referring to FIG. 12, the controller 180 displays an indicator for associating recorded audio content with first contents on the display unit 151 (S210).

The controller 180 associates the indicator with at least one item included in the first contents (S220). Here, associating the indicator with at least one item may mean an input of dragging the indicator to a certain item.

The controller 180 may map the audio content of the played video to the item, and store the same (S230).

Figure 13:
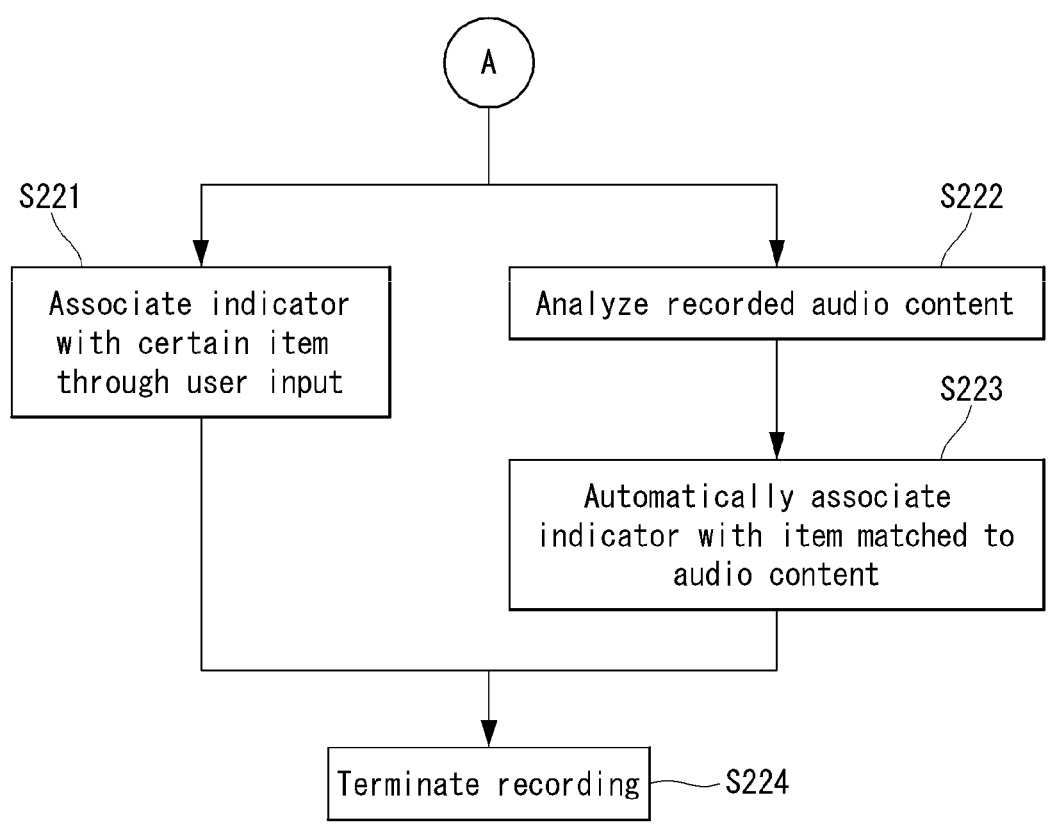
FIG. 13 is a detailed flow chart illustrating a control method of an electronic device to illustrate the second embodiment of the present invention in detail.

FIG. 13 is a detailed flow chart illustrating a control method of an electronic device to illustrate the second embodiment of the present invention in detail.

Referring to FIG. 13, the controller 180 may associate the indicator with a certain item through a user input (S221).

The controller 180 may automatically analyze recorded audio content (S222) and automatically associate the indicator with an item matched to the audio content (S223).

Thereafter, when the recording is completed, the controller 180 may map the recorded audio to the indicator-associated item and store the same.

Figure 14:
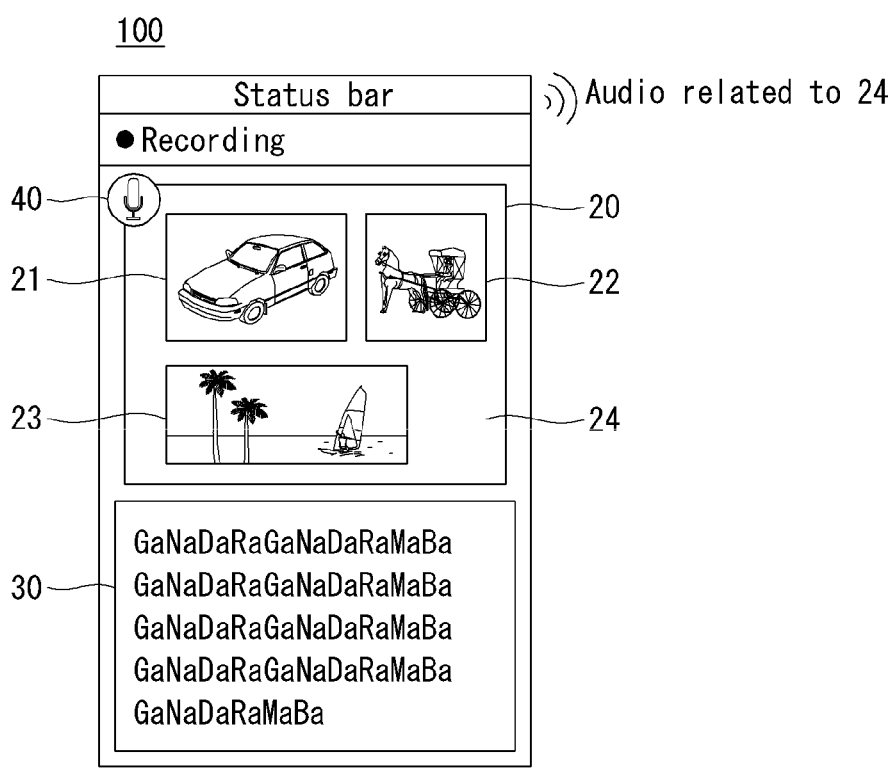
FIGS. 14 through 16 are views illustrating examples of controlling audio recording according to each subject of played video according to the second embodiment of the present invention.
Figure 15:
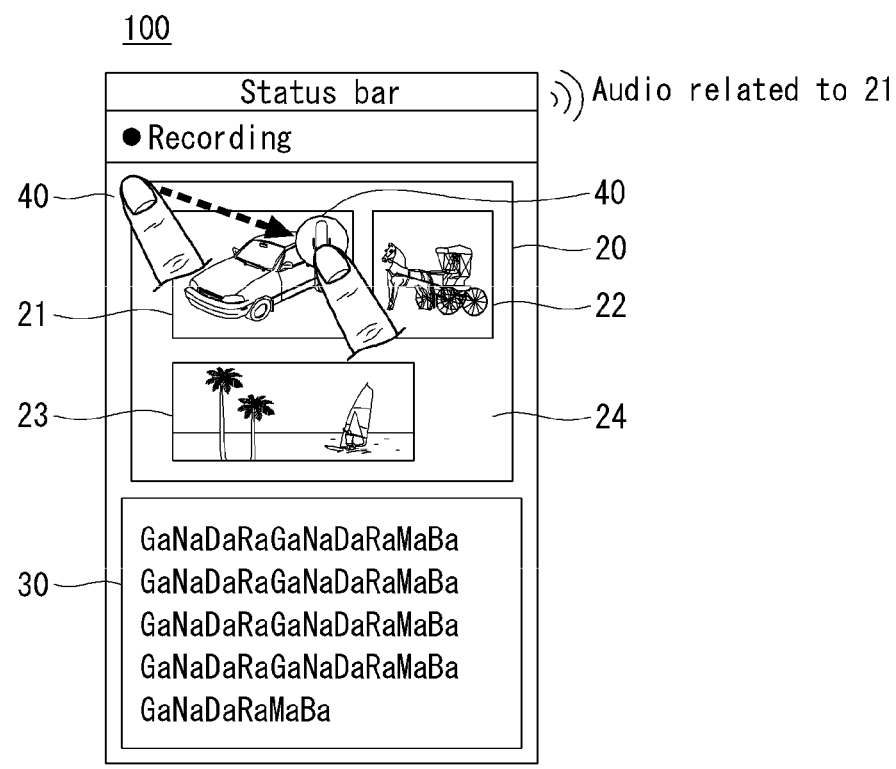
Figure 16:
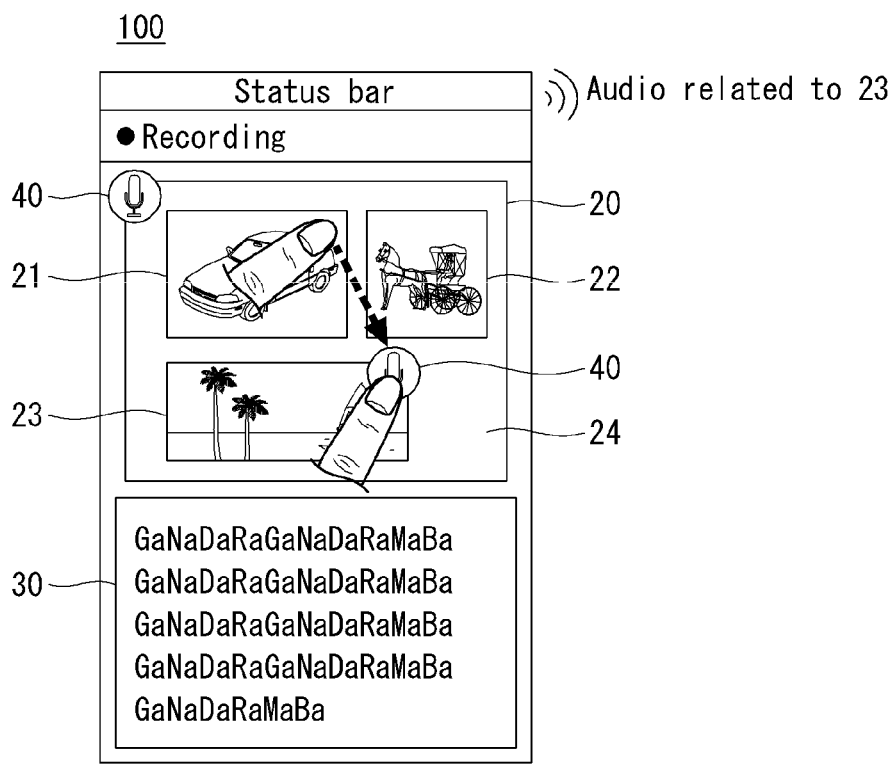

FIGS. 14 through 16 are views illustrating examples of controlling audio recording according to each subject of played video according to the second embodiment of the present invention.

In the second embodiment of the present invention, recorded audio content may be associated with at least one item.

Referring to FIG. 14, the controller 180 may display the first contents 20 and the second contents 30 in regions of the touchscreen 151, respectively.

The first contents 20 includes at least one item 21, 22, 23, and 24, and in a state in which a video related to the first contents 20 is played and certain audio is recorded, the controller 180 displays the indicator 40 for associating the recorded audio content with the item on the touchscreen 151.

For example, with reference to FIG. 14, when audio output through the currently played video is related to the fourth item 24, the indicator 40 may be associated with the fourth item 24 according to a user input.

Also, for example, referring to FIG. 15, when audio output through the currently played video is related to the first item 21, the indicator 40 may be associated with the first item 24 according to a user input.

Also, for example, referring to FIG. 16, when content related to the first item 21 is terminated and audio content related to the third item is output, the user may associate the indicator 40 associated with the first item 21, with the third item 23. As described above, the indicator 40 and the item may be associated by superposing the indicator 40 onto the item through a drag input.

In the foregoing examples, it can be seen that, in a case in which audio content output from a particular section while a video is being played is related to a particular item, the user may associate a certain indicator with the item to inform that the audio content related to the item has been recorded.

Meanwhile, in the case of FIGS. 17 through 19, an example of playing recording results by controlling a movement of an indicator after certain audio is recorded in relation to a particular item will be described.

Figure 17:
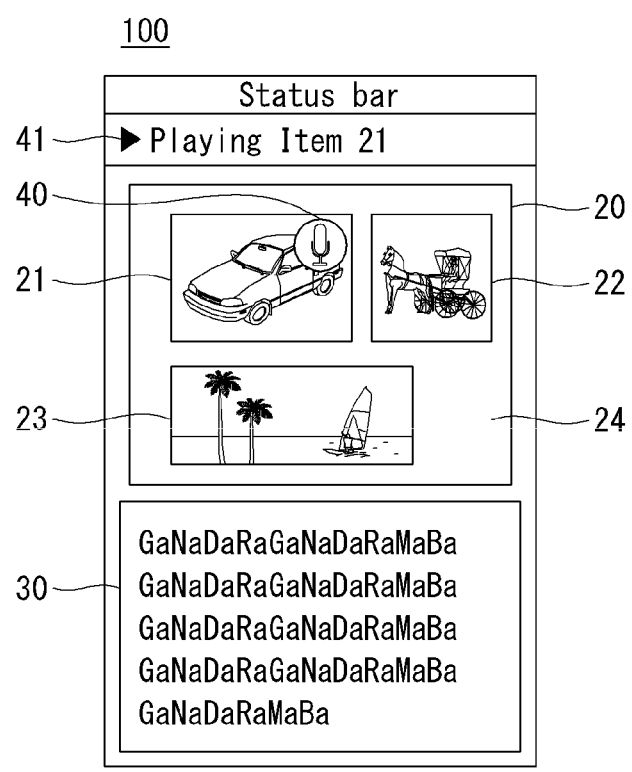
FIGS. 17 through 19 are views illustrating examples of playing recorded audio by subjects according to the second embodiment of the present invention.
Figure 18:
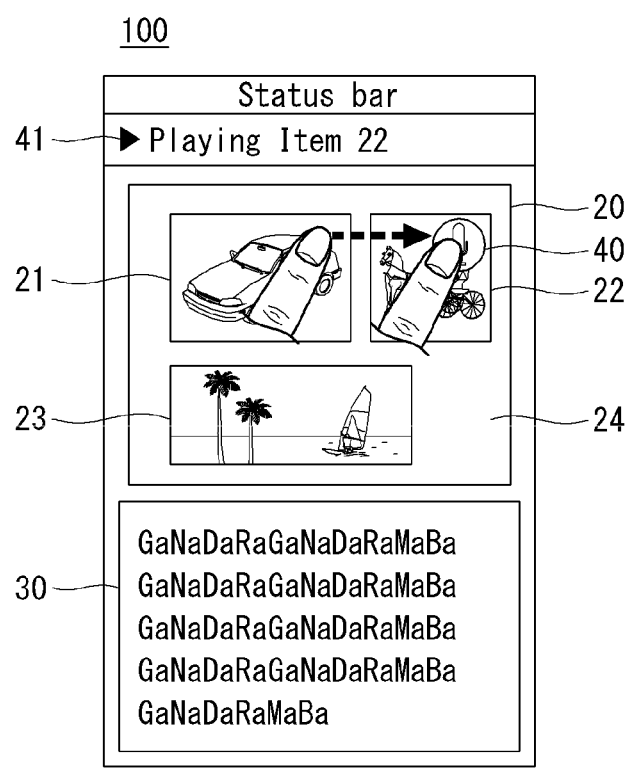
Figure 19:
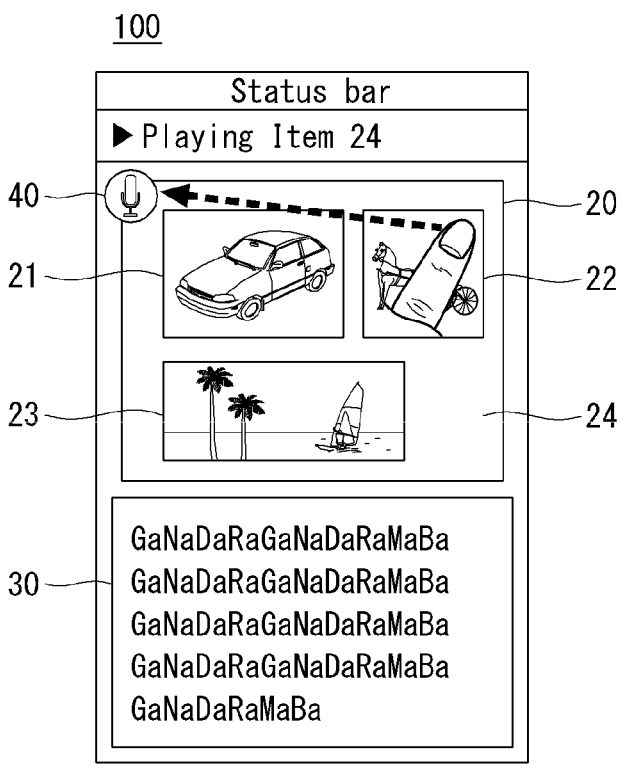

FIGS. 17 through 19 are views illustrating examples of playing recorded audio by subjects according to the second embodiment of the present invention.

Referring to FIG. 17, in a case in which the indicator 40 is displayed to overlap with the first item 41, the controller 180 plays an audio file recorded in relation to the first item 41. In this case, the controller 180 may display the indicator 40 indicating that recorded audio is being placed with respect to the first item 21, on the touchscreen 151.

Referring to FIG. 18, in a case in which an input for moving the indicator 40 displayed in the first item 41 to the second item 22, the controller 180 stops playing of the audio related to the first item 21 and plays recorded audio with respect to the second item 22. Similarly, the controller 180 may display the indicator 40 indicating that the recorded audio with respect to the second item 22 is being played, on the touchscreen 151.

Meanwhile, referring to FIG. 19, when an input for moving the indicator 40 displayed in the second item 22 to the fourth item 24 is received, the controller 180 reproduces and outputs recorded audio with respect to the fourth item 24.

Namely, according to the foregoing embodiments, when the user moves a certain indicator (e.g., an icon having a microphone shape) to a certain item, the electronic device 100 first determines whether an audio file recorded in association with the item exists. Thereafter, there a recorded audio file exists, the controller 180 may play the recorded audio file with respect to the particular item while the indicator is being associated with the particular item.

Figure 20:
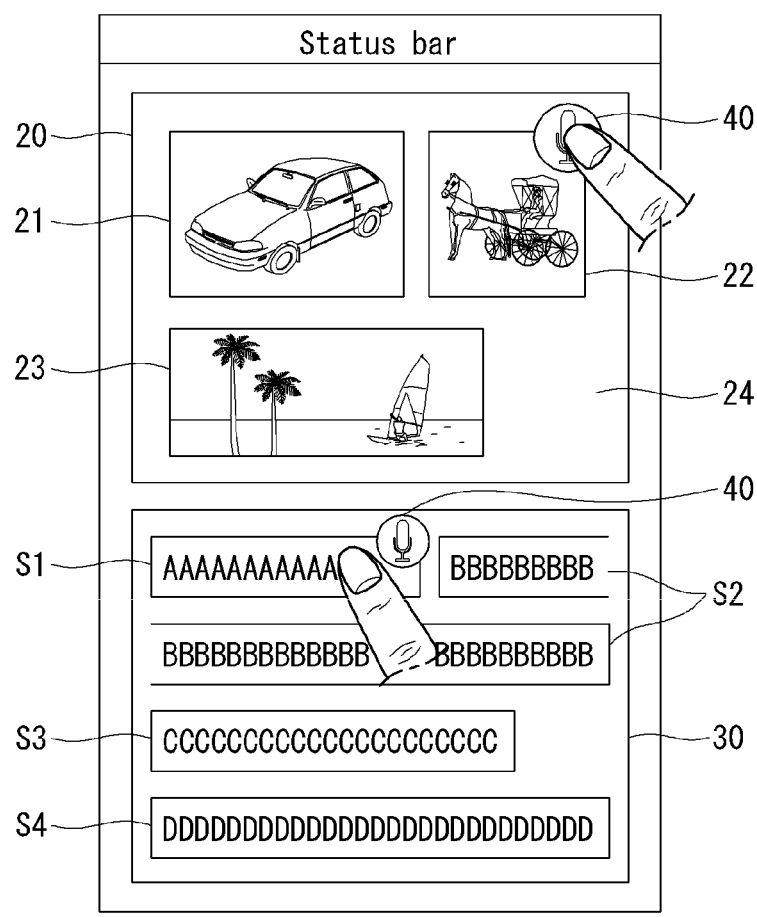
FIG. 20 is a view illustrating an example of specifically editing an audio-mapped sentence among text-converted sentences according to the second embodiment of the present invention.

Meanwhile, referring to FIG. 20, in a state in which the items 21, 22, 23, and 24 stored in association with certain audio are displayed on the touchscreen 151, when a predetermined touch input with respect to any one item 22 among the plurality of items 21, 22, 23, and 24 is received, a user interface 30 for editing audio stored upon being mapped to the selected item 22 is provided.

For example, in a case in which a long-touch input with respect to the second item 22 is received, the controller 180 may display a user interface 30 in which audio content recorded in relation to the second item 22 is converted into text of sentence units S1, S2, S3, and S4, on the touchscreen 151. Namely, since audio content related to the second item 22 is visually displayed as illustrated in FIG. 20, the user may perform editing of selecting only desired text or deleting unnecessary text.

By selecting at least one sentence unit among the text S1, S2, S3, and S4 in units of a plurality of sentences, the controller 180 may edit only the selected sentence, as audio content associated with the second item 22.

For example, when an input for selecting the first sentence S1 among the text S1, S2, S3, and S4 in units of a plurality of sentences is received, the controller 180 may tag the indicator 40 to the first sentence S1 to recognize the audio file corresponding to the second item 22, as the first sentence S1.

Figure 21:
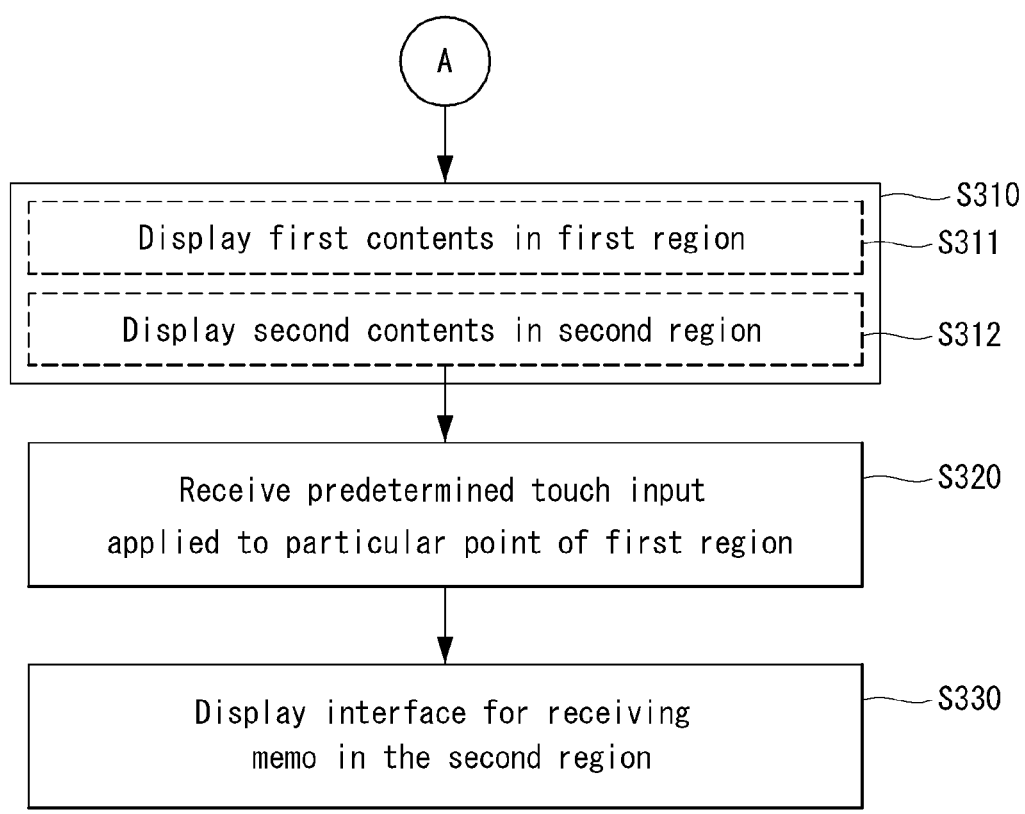
FIG. 21 is a flow chart illustrating a control method of an electronic device according to a third embodiment of the present invention.

FIG. 21 is a flow chart illustrating a control method of an electronic device according to a third embodiment of the present invention. FIGS. 22 through 27 are views illustrating the third embodiment of the present invention.

Referring to FIG. 21, the controller 180 displays first contents and second contents on the touchscreen 151 (S310). The controller 180 displays the first contents in a first region of the touchscreen 151 and the second contents in a second region of the touchscreen 151 (S312).

When a predetermined touch input applied to a particular spot of the first region is received (S320), the controller 180 may display an interface for receiving a memo with respect to the particular spot, in the second region (S330).

Namely, in the third embodiment of the present invention, while a video lecture is being played, when certain memo is desired to be input to data related to the video lecture, a user interface for the memo is provided.

Figure 22:
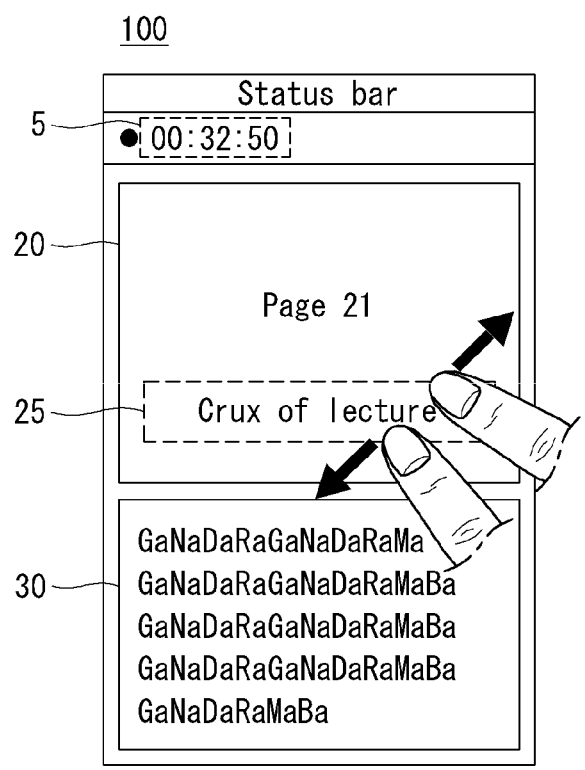
FIGS. 22 through 27 are views illustrating the third embodiment of the present invention.

Referring to FIG. 22, the controller 180 may display the first contents 20 in the first region of the touchscreen 151 and the second contents 30 in the second region of the touchscreen 151. While the video is being played, audio is being recorded, and the controller 180 may display a time duration 4 of the recording on the touchscreen 151.

Figure 23:
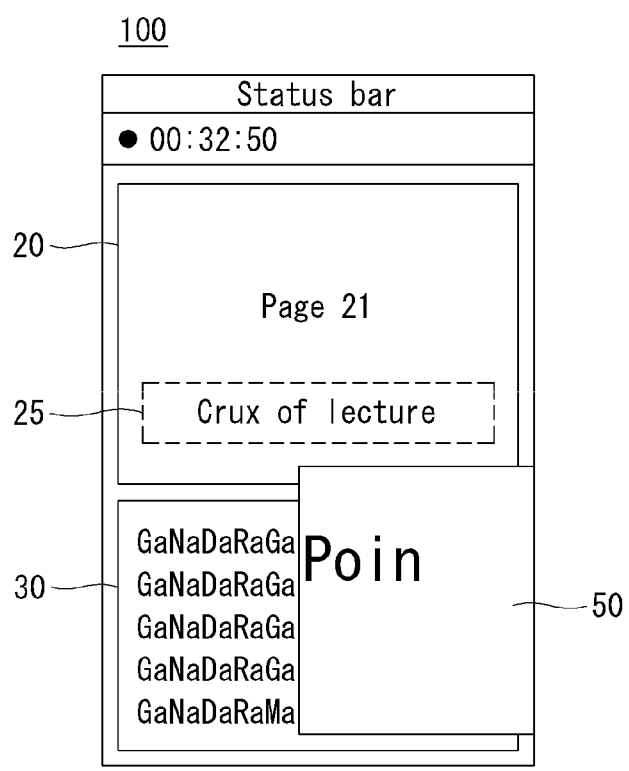

Referring to FIGS. 22 and 23, when a multi-touch input, i.e., a zoom-in input, with respect to first contents 25 included in the first region is received, the controller 180 may provide an interface 50 for inserting a memo into the point at which the touch input was received, to at least a portion of the second region.

Figure 24:
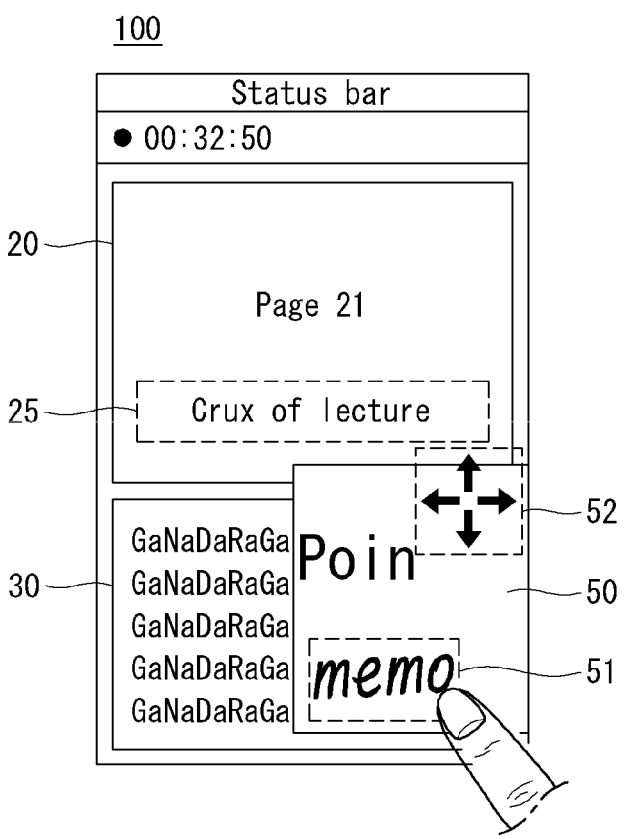

Referring to FIG. 24, the controller 180 may receive a handwriting input 51 in the interface 50 for inputting the memo. Meanwhile, the interface 50 may include a predetermined direction key 52 to adjust a position in which a memo is desired to be inserted, through the direction key 52.

Figure 25:
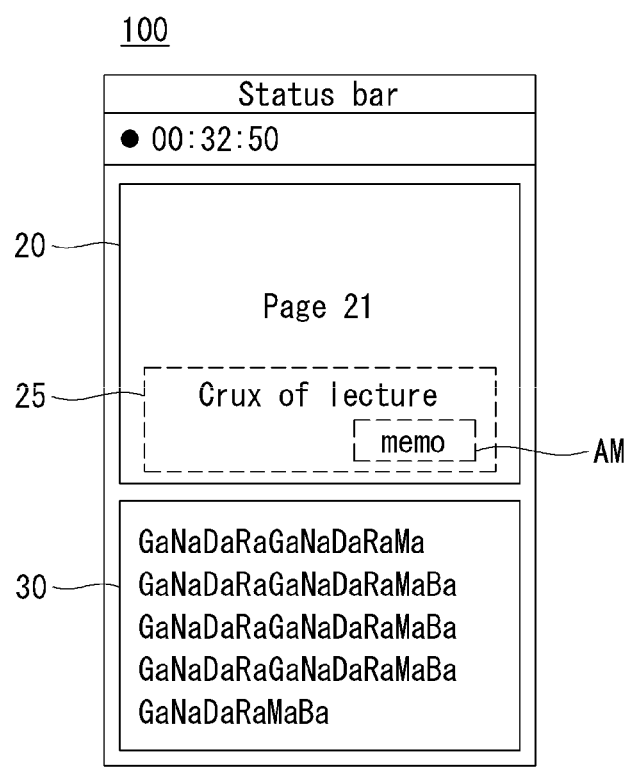

Referring to FIG. 25, when a certain user handwriting input is received through the interface 50 displayed in the second region 30, the controller 180 inserts the handwriting-input memo into a portion AM of the first region 20 in which the multi-touch input was received, so as to be displayed.

Meanwhile, in an embodiment of the present invention, the interface for inserting the memo is not limited to the region for receiving the foregoing user handwriting input.

Figure 26:
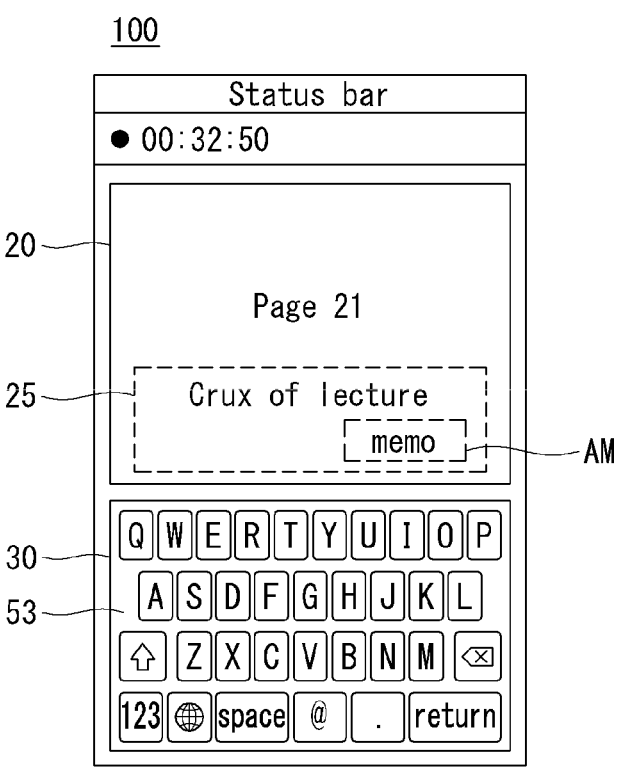

For example, referring to FIG. 26, the interface may include a virtual keyboard 53. The virtual keyboard 53 may be displayed in the second region 30, and a memo input through the virtual keyboard 53 may be insertedly displayed in the particular spot of the first region 20.

Figure 27:
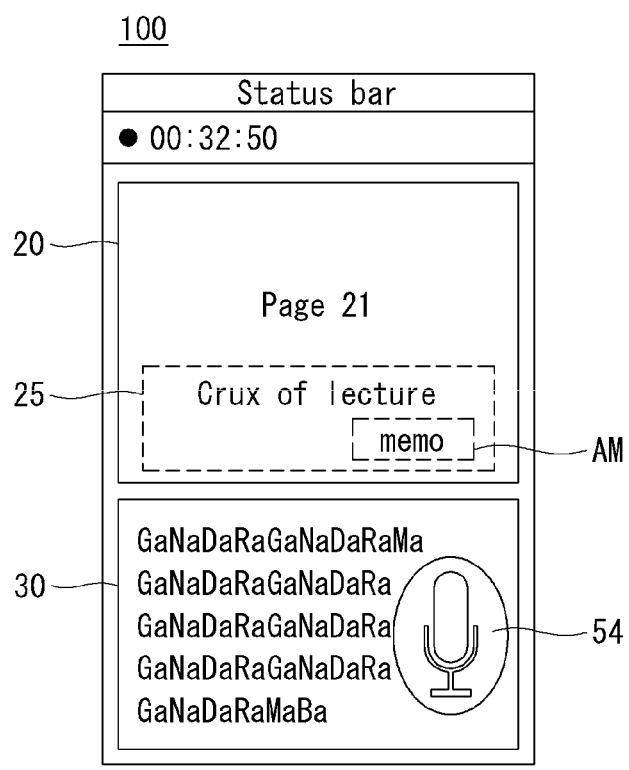

Also, for example, referring to FIG. 27, the interface may be configured to activate an audio input module (the microphone 122 in FIG. 1) and display a microphone icon 54 in the second region 30. In this case, the microphone (122 in FIG. 1) is activated to recognize a voice command (memo) of the user and insert the recognition result into the particular spot AM of the first region 20 so as to be displayed.

Figure 28A:
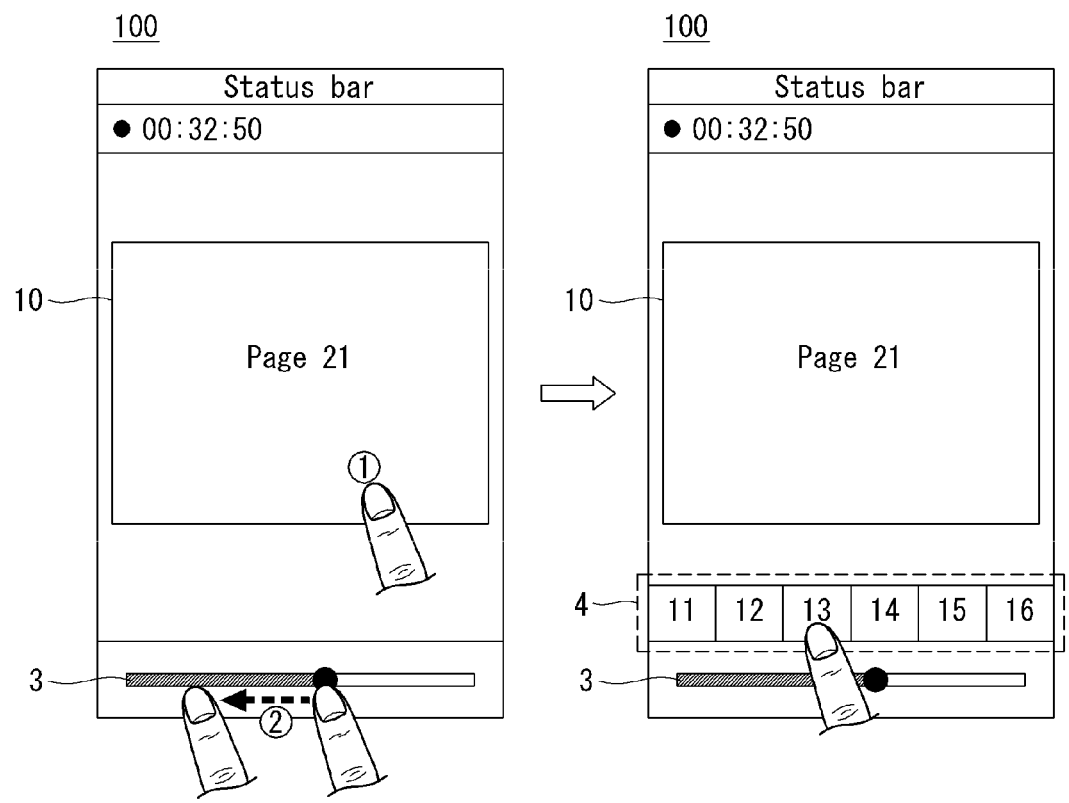
FIGS. 28A through 28C are views illustrating a fourth embodiment of the present invention.
Figure 28B:
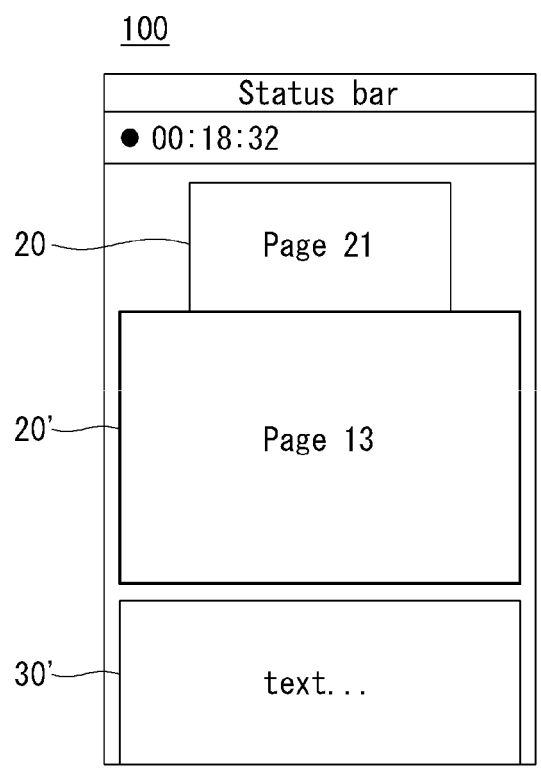
Figure 28C:
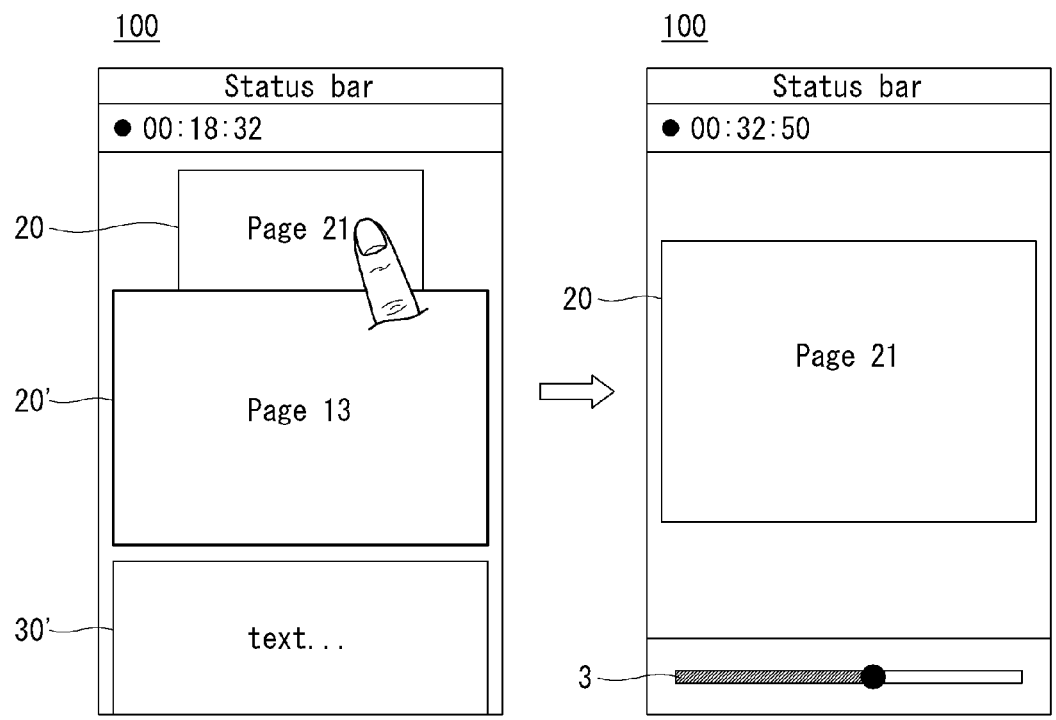

FIGS. 28A through 28C are views illustrating a fourth embodiment of the present invention. In the fourth embodiment, a case of selecting a desired page among audio-recorded video pages will be described.

Referring to FIG. 28A, when a touch input applied to the video playback screen 10 is received, the controller 180 displays a progress bar 3 for controlling playing of the video on the touchscreen 151. When an input of selecting a point of the progress bar 3 and dragging it to a different point is received, the controller 180 may display thumbnail images 4 corresponding to a plurality of playback pages mapped to the progress bar 3 in playback time order, in an upper portion of the progress bar 3.

When an input for selecting a desired page (e.g., page 13) among the thumbnail images 4 is received, as illustrated in FIG. 28B, a first playback screen (page 21) may retreat on the touchscreen 151 and the selected second playback screen 20' (page 13) may be displayed in a central region of the touchscreen 151. Also, the first playback screen 20 and the second playback screen 20' correspond to the first contents. Also, the controller 180 may display the second contents 30', generated as audio corresponding to the second playback screen was converted into text, on the touchscreen 151.

In FIG. 28C, when the first playback screen 20 is selected again, the controller 180 may display the first playback screen 20 in the central region of the touchscreen 151 and play audio corresponding to the first playback screen 20.

FIGS. 29 through 32 are views illustrating a fifth embodiment of the present invention. In the fifth embodiment, when a video is a lecture, an identification sign for identifying a lecturer is displayed together.

Figure 29:
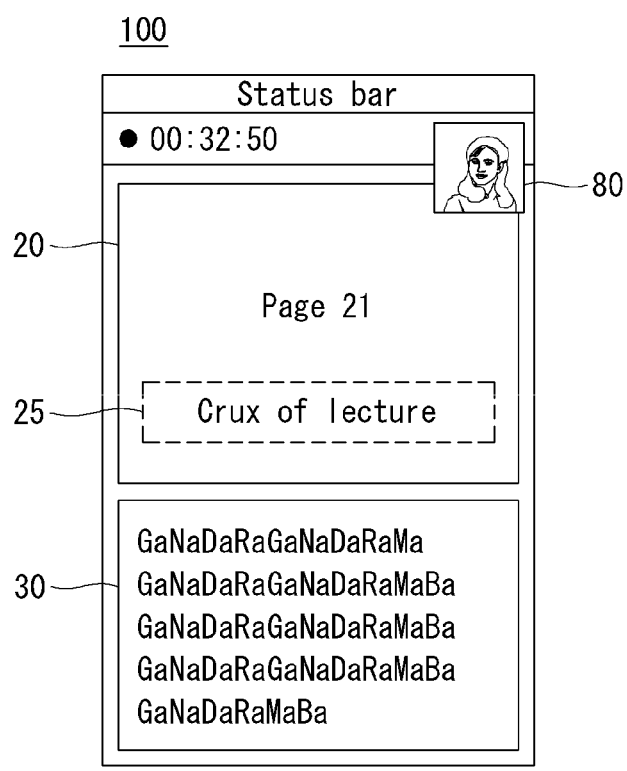
FIGS. 29 through 32 are views illustrating a fifth embodiment of the present invention.

Referring to FIG. 29, while a video lecture is being performed, the controller 180 may display the first contents 20 and the second contents 30 on the touchscreen 151 and also display an avatar image 80 indicating the lecturer in a certain region of the touchscreen 151, as well.

Meanwhile, the fifth embodiment of the present invention is not limited to the video playback and may also be applied to examples in which a video call, such as a conference call, and the like, is performed through a camera and content of the video call is converted into text and displayed while content of the video call is being recorded. Namely, referring to FIG. 29, the image displayed in the avatar image 80 may be an image of a counterpart of the video call, and the second contents 30 may be contents generated by converting the content of the video call into text.

Figure 30:
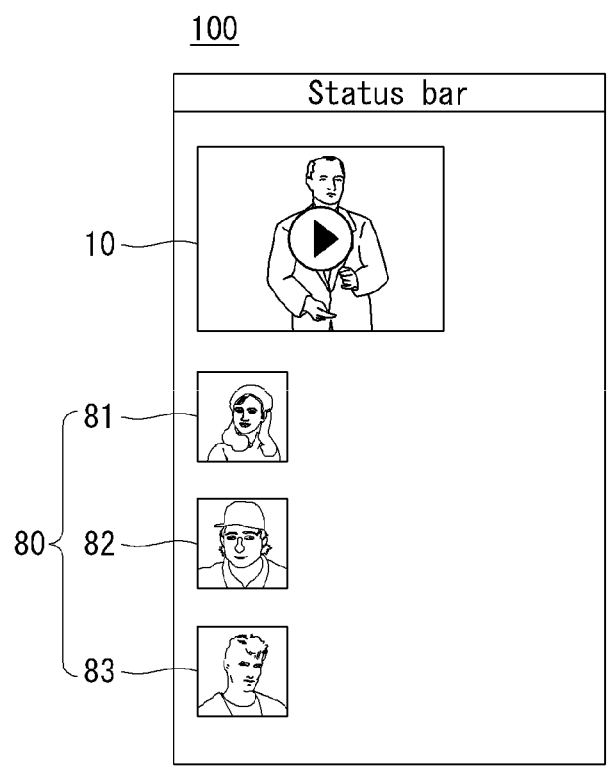

Referring to FIG. 30, while the video 10 is being played according to the first to fourth embodiments of the present invention, the controller 180 may display images 80, 81, 81, and 83 of the speakers corresponding to the output audio on the touchscreen 151 according to order of playback time. In this case, it is assumed that the video 10 illustrated in FIG. 30 is obtained by mapping certain speaker images together with audio and storing the same.

Figure 31:
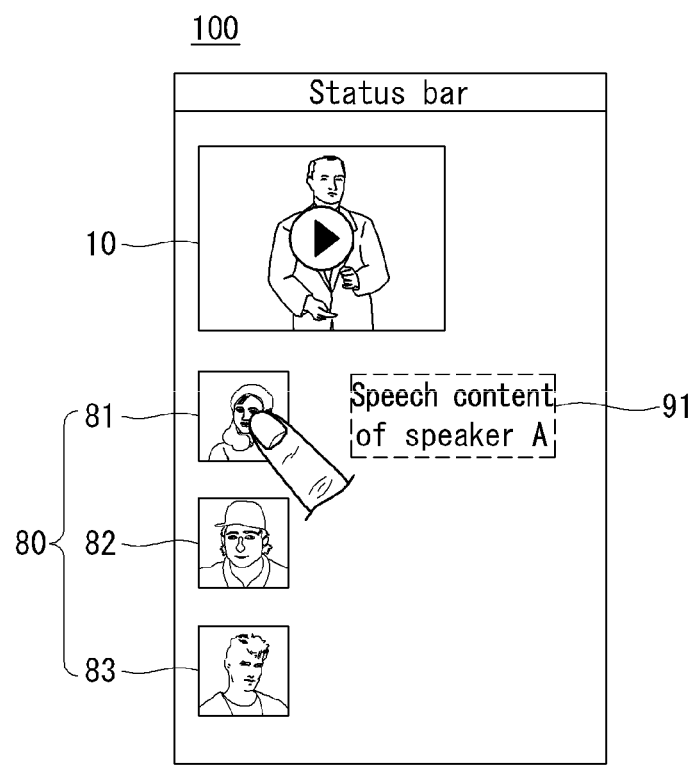

Referring to FIG. 31, when a first speaker image 81, among the plurality of speaker images 81, 82, and 83, is selected, the controller 180 may display text 91 generated as content spoken by the speaker was converted into text, in the vicinity of the first speaker image 81.

Meanwhile, as described above, speakers played by audio are identified through images corresponding to the speakers. However, the present invention is not limited thereto. For example, when speech content of each speaker is displayed as text, the speakers may be identified by changing display characteristics of the text. For example, text corresponding to speech content of the first speaker may be displayed to have a first color, and text corresponding to speech content of the second speaker may be displayed to have a second color.

Figure 32:
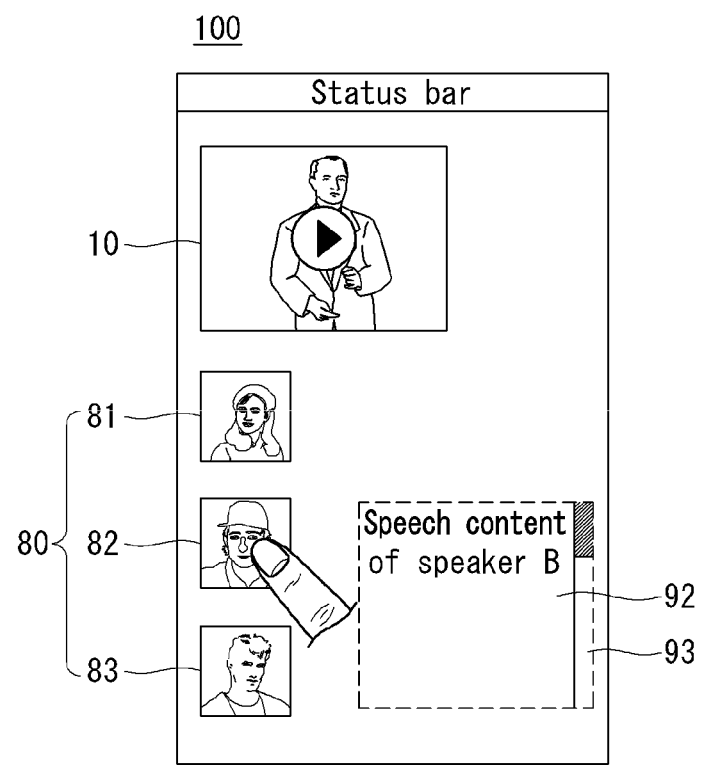

Meanwhile, referring to FIG. 32, when the second speaker image 82, among the plurality of speaker images 81, 82, and 83 illustrated in FIG. 31, is selected, content spoken by the second speaker is converted into text and the corresponding text 92 may be displayed in the vicinity of the second speaker image 82. Here, a scroll bar 93 for scrolling the text 92 may also be displayed together.

Figure 33A:
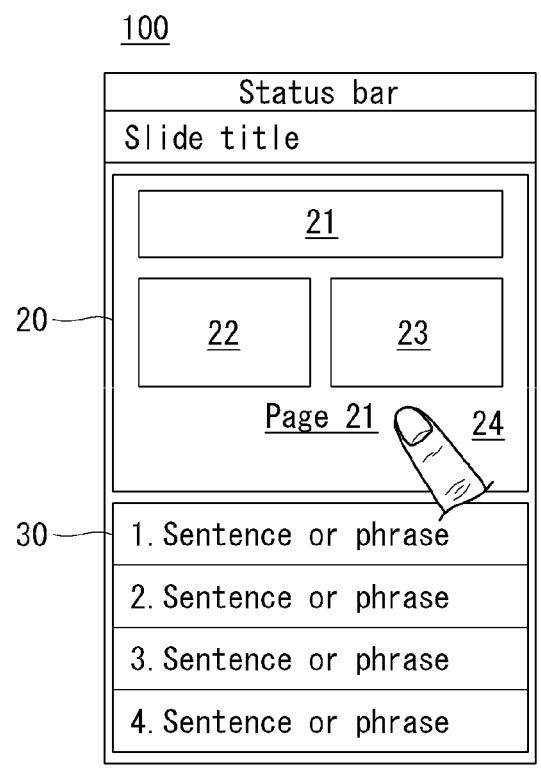

FIGS. 33A through 34 are views illustrating a sixth embodiment of the present invention. In the sixth embodiment of the present invention, when the user marks an important identification sign for the first contents while viewing and listening to a video, only contents to which the corresponding identification sign is tagged is extracted and displayed.

Referring to FIG. 33A, in a state in which the first contents 20 and the second contents 30 are displayed, when a long-touch input applied to the first contents region is received, a mode for recognizing a user's handwriting input with respect to the first contents 20 region is entered.

Figure 33B:
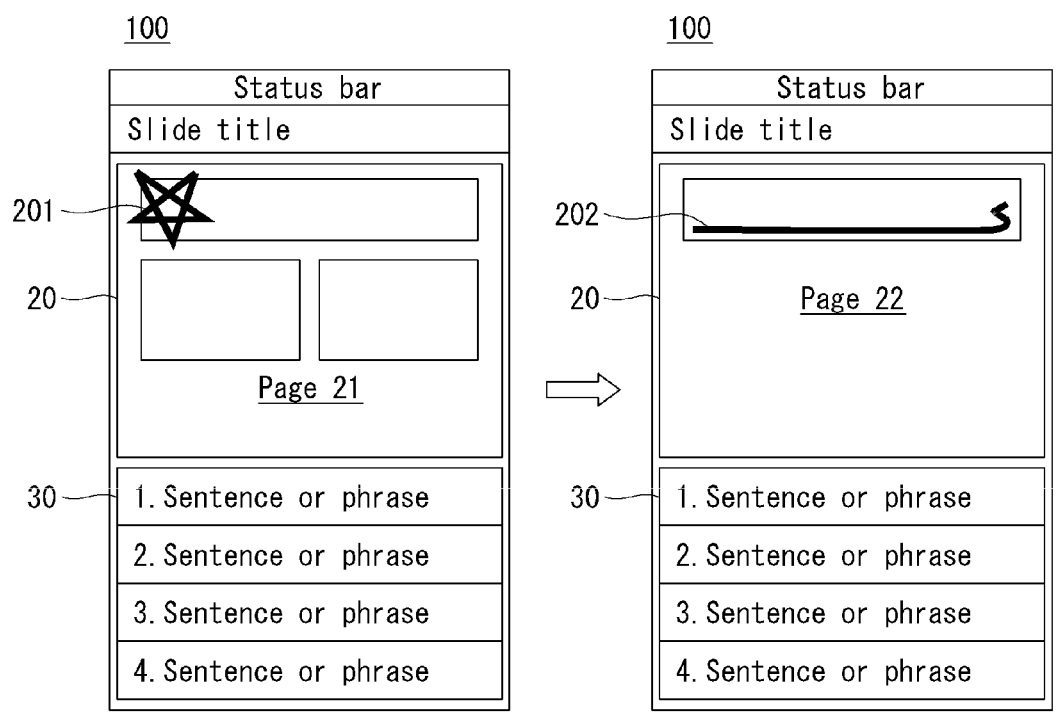

Here, as illustrated in FIG. 33B, the user's handwriting input may be an input of highlighting a particular item of the first contents 10. For example, the highlighting input may include an asterisk 201, an underline 202, magnifying of the item in size, or the like.

Thereafter, as illustrated in FIG. 34, the controller 180 may summarize only the highlighted portion of the first contents related to the video and display the same on the touchscreen 151, while the user is viewing and listening to it. Here, the displayed summarized item may include a page number of the first contents, text generated by converting the recorded audio into text, highlighting, and the like.

In the foregoing embodiments, while certain audio is being output through the audio output module 152, the audio is recorded, and when contents related to the recorded audio content exists, the contents is displayed on the touchscreen, the recorded audio content is converted into text in real time, and the converted text is displayed by sentences.

However, in the present embodiment, recorded audio is not limited to a sound output through the audio output module 152 of the electronic device 100. For example, in an embodiment of the present invention, audio recording may be performed in a lecture hall offline. Hereinafter, a case in which recorded audio is a user's voice will be described with reference to FIGS. 35 and 36.

Figure 35:
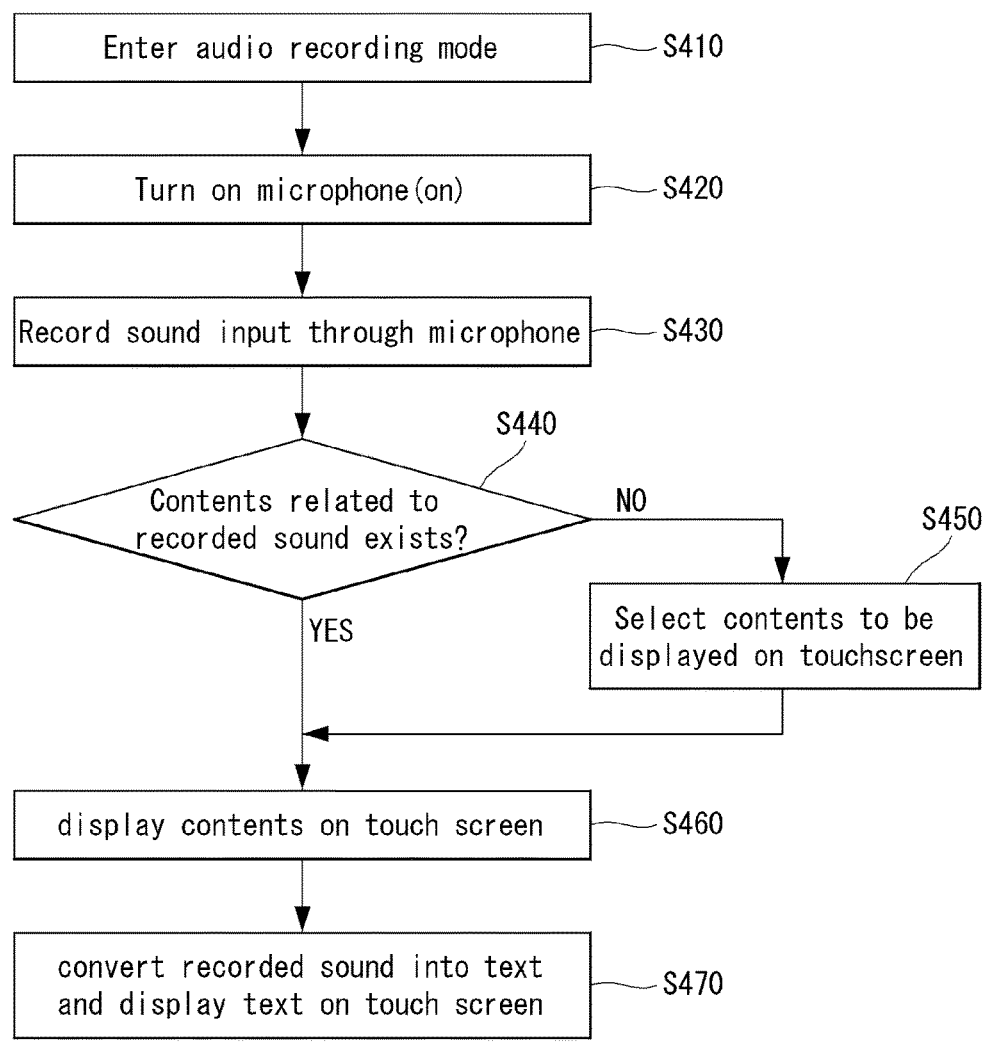
FIG. 35 is a flow chart illustrating a control method of an electronic device according to a seventh embodiment of the present invention.
Figure 36:
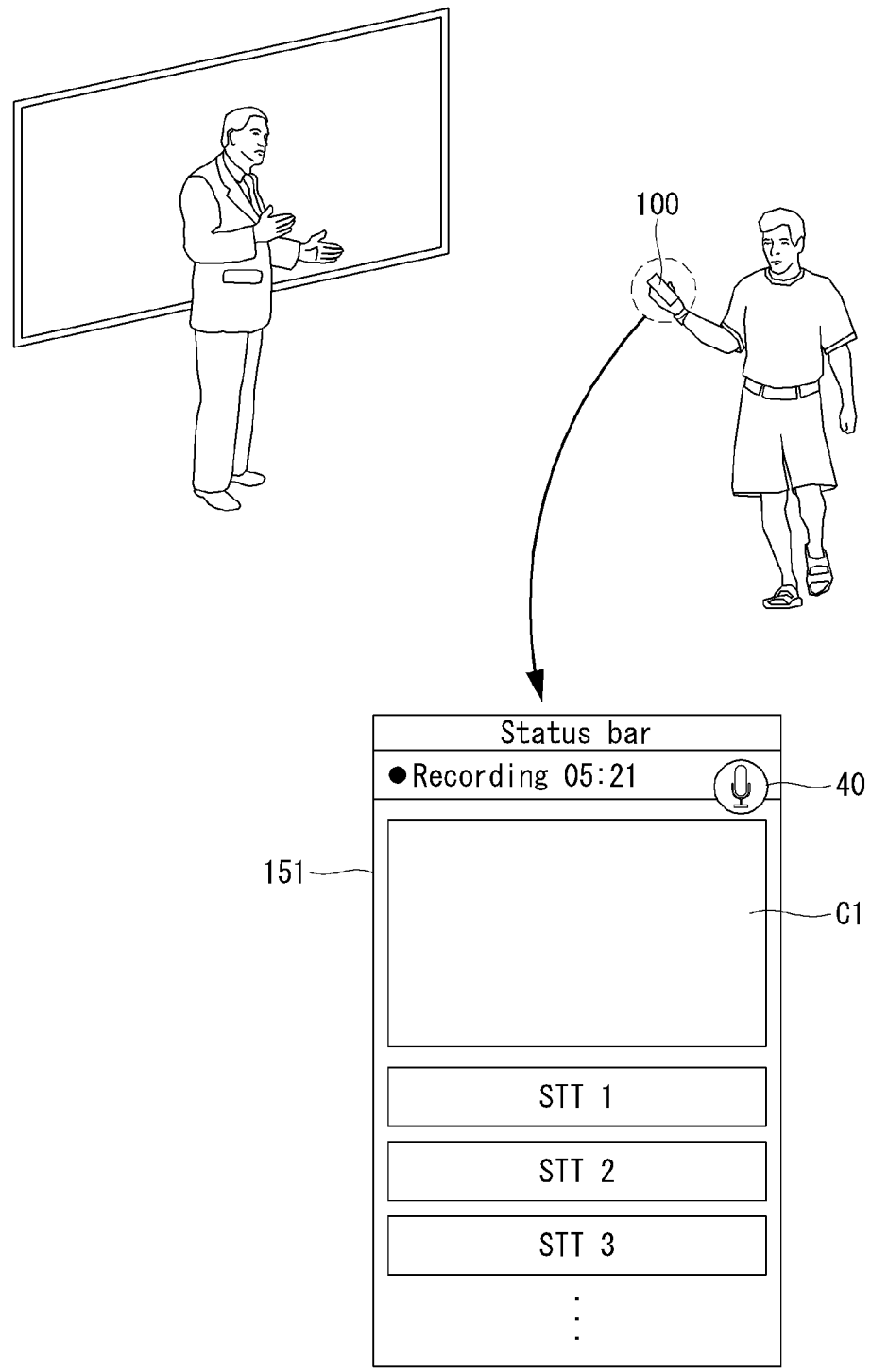
FIG. 36 is a view illustrating the seventh embodiment of the present invention.

FIG. 35 is a flow chart illustrating a control method of an electronic device according to a seventh embodiment of the present invention. FIG. 36 is a view illustrating the seventh embodiment of the present invention. The control method of an electronic device according to the seventh embodiment of the present invention may be implemented by the electronic device 100 as described above with reference to FIGS. 1 and 2.

Referring to FIG. 35, the controller 180 enters an audio recording mode (S410). In the audio recording mode, the controller 180 turns on the microphone (122 in FIG. 1) and records a sound input to the microphone (122 in FIG. 1) (S430).

Here, the audio input through the microphone (122 in FIG. 10 is a sound input from the outside. The sound may be a voice of a lecturer.

Meanwhile, the controller 180 determines whether contents related to the recorded sound exists (S440). When contents related to the sound exists within the electronic device 100, the controller 180 may display the contents in a region of the touchscreen 151 (S460).

Here, the controller 180 may analyze content of the sound and read contents corresponding to the sound from the memory 160 of the electronic device 100.

Meanwhile, when contents related to the sound does not exist in the electronic device 100, the controller 180 may select contents to be displayed on the touchscreen 151 according to a user input (S450), and display the selected contents on the touchscreen 151 (S460).

The controller 180 may convert the recorded sound into text and display the text in a region of the touchscreen 151 (S470). The example of converting a sound into text and displaying the text is the same as that described above.

Referring to FIG. 36, the electronic device 100 enters the audio recording mode, and in the audio recording mode, the electronic device 100 may display contents STT1, STT2, and STT3 obtained by converting speech content of a lecturer into text and contents 1 related to the speech content on the touchscreen 151.

The above-described method of controlling the electronic device may be written as computer programs and may be implemented in digital microprocessors that execute the programs using a computer readable recording medium. The method of controlling the electronic device may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

An electronic device may include a first touchscreen configured to display a first object, a second touchscreen configured to display a second object, and a controller configured to receive a first touch input applied to the first object and to link the first object to a function corresponding to the second object when receiving a second touch input applied to the second object while the first touch input is maintained.

A method may be provided of controlling an electronic device that includes displaying a first object on the first touchscreen, displaying a second object on the second touchscreen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
a touchscreen;
a microphone;
memory storing a video;
a sound output module; and
a controller operatively coupled to the touchscreen and being configured to:
control the touchscreen to display a playback screen providing video playback of the video, wherein audio included in the video is output through the sound output module during the video playback of the video;
control the electronic device to enter a mode for recording the audio in response to a predetermined input with respect to the playback screen, wherein the microphone is activated when the mode for recording the audio is started;
record the audio output through the sound output module in the mode for recording the audio, wherein the recording of the audio output occurs during the video playback of the video;
cause the touchscreen to display text generated from converting the recorded audio into the text, wherein the displayed text corresponds to the audio of the displayed video playback of the video and is displayed during the video playback of the video;
receive a drag input with respect to only a selected portion of the displayed text such that the displayed text comprises the selected portion and a remaining portion of text, wherein the displayed text remains in a fixed spatial relationship within the playback screen during the receiving of the drag input; and
control the touchscreen to display a cancel indicator overlaid with the selected portion of the displayed text and not overlaid with the remaining portion of the text, wherein the cancel indicator indicates that the selected portion is not to be included in an audio file, wherein the cancel indicator, the selected portion, and the remaining portion of text, are all displayed after the drag input is received;
store, in the memory, the audio file that includes audio for the remaining portion of text but does not include audio for the selected portion of the displayed text;
wherein the video includes at least one item and the controller is further configured to:
cause the touchscreen to display an indicator for associating the recorded audio with the at least one item displayed on the touchscreen;
when an input for associating the indicator with any one item of the at least one item is received, mapping the recorded audio to the one item; and wherein the indicator is displayed such that it is associated with the one item that has been mapped to the recorded audio.

2. The electronic device of claim 1, wherein the predetermined input includes input on a switch button included in the playback screen or a long touch input with respect to the playback screen.

3. The electronic device of claim 1, wherein the displayed text include separated sentences.

4. The electronic device of claim 3, wherein the controller is further configured to:
cause audio output at the sound output module in response to an input received with regard to a particular sentence of the separated sentences, wherein the audio output includes audio that corresponds to the particular sentence.

5. The electronic device of claim 3, wherein the controller is further configured to:
cause the touchscreen to display a progress bar indicating that the audio that corresponds to the particular sentence is being recorded, wherein the progress bar includes a header indicating a recording spot at a current point in time, and
when an input for dragging the header to a first point corresponding to a previous recording time is received, the controller causes the touchscreen to display the header at a second point corresponding to a starting point of a sentence including text corresponding to audio of the first point and to display the sentence starting from the second point on the touchscreen.

6. The electronic device of claim 1, wherein the controller is further configured to:
cause the touchscreen to display an indicator indicating the recording of the audio.

7. The electronic device of claim 6,
wherein the controller is further configured to:
cause audio output at the sound output module in response to an input received with regard to the video, wherein the audio output includes the recorded audio.

8. The electronic device of claim 7, wherein the controller is further configured to:
cause the touchscreen to display a point corresponding to a point in time at which the input received with regard to the video was received, wherein the point is displayed at the progress bar to permit controlling of the video playback of the video.

9. The electronic device of claim 1, wherein the video playback is in a first region of the touchscreen and the text is displayed in a second region of the touchscreen, and
wherein the controller is further configured to:
when a touch input is received at a particular portion of the first region, cause the touchscreen to display a memo interface for receiving a memo to be associated with the particular portion of the first region.

10. The electronic device of claim 9, wherein the touch input received at the particular portion includes a zoom-in input with respect to the particular portion.

11. The electronic device of claim 9, wherein the memo interface includes an indicator for indicating whether a handwriting input region for receiving a user's handwriting input, a virtual keyboard region, or an audio input module for receiving a user's voice has been activated.

12. A method for controlling an electronic device having a microphone and sound output module, the method comprising:
storing a video in memory of the electronic device;
displaying, via a touchscreen a playback screen providing video playback of the video, wherein audio included in the video is output through the sound output module during the video playback of the video;
entering a mode for recording the audio in response to a predetermined input with respect to the playback screen, wherein the microphone is activated when the mode for recording the audio is started;
recording the audio output through the sound output module in the mode for recording the audio, wherein the recording of the audio output occurs during the video playback of the video;
displaying on the touchscreen text generated from converting the recorded audio into the text, wherein the displayed text corresponds to the audio of the displayed video playback of the video and is displayed during the video playback of the video;
receiving a drag input with respect to only a selected portion of the displayed text such that the displayed text comprises the selected portion and a remaining portion of text, wherein the displayed text remains in a fixed spatial relationship within the playback screen during the receiving of the drag input;
displaying on the touchscreen a cancel indicator overlaid with the selected portion of the displayed text and not overlaid with the remaining portion of the text, wherein the cancel indicator indicates that the selected portion is not to be included in an audio file, wherein the cancel indicator, the selected portion, and the remaining portion of text, are all displayed after the drag input is received;
storing, in the memory, the audio file that includes audio for the remaining portion of text but does not include audio for the selected portion of the displayed text;
displaying an indicator on the touchscreen for associating the recorded audio with at least one item displayed on the touchscreen, wherein the at least one item is included in the video;
mapping the recorded audio to the one item when an input for associating the indicator with any one item of the at least one item is received; and
displaying the indicator such that it is associated with the one item that has been mapped to the recorded audio.

13. The method of claim 12, wherein the displayed text include separated sentences, the method further comprising:
cause audio output at a sound output module in response to an input received with regard to a particular sentence of the separated sentences, wherein the audio output includes audio that corresponds to the particular sentence.

14. The method of claim 12, wherein the displayed text include separated sentences, the method further comprising:
displaying on the touchscreen, a progress bar indicating that the audio that corresponds to the particular sentence is being recorded, wherein the progress bar includes a header indicating a recording spot at a current point in time, and
when an input for dragging the header to a first point corresponding to a previous recording time is received, displaying on the touchscreen the header at a second point corresponding to a starting point of a sentence including text corresponding to audio of the first point and displaying the sentence starting from the second point.

* * * * *